United States Patent [19]

Barrett, Jr.

[11] Patent Number: 4,471,345
[45] Date of Patent: Sep. 11, 1984

[54] RANDOMIZED TAG TO PORTAL COMMUNICATION SYSTEM

[75] Inventor: Raymond L. Barrett, Jr., Oakland Park, Fla.

[73] Assignee: Sensormatic Electronics Corporation, Deerfield Beach, Fla.

[21] Appl. No.: 354,156

[22] Filed: Mar. 5, 1982

[51] Int. Cl.³ .............................................. G08B 13/22
[52] U.S. Cl. .................................... 340/572; 340/505; 340/825.32
[58] Field of Search ........... 340/572, 505, 573, 825.31, 340/825.32, 825.34; 343/6.8 LC, 6.5 LC

[56] References Cited

U.S. PATENT DOCUMENTS

| | | | |
|---|---|---|---|
| 3,859,624 | 1/1975 | Kriofsky et al. | 340/38 L |
| 4,015,259 | 3/1977 | Siverhus et al. | 343/6.8 LC |
| 4,196,418 | 4/1980 | Kip et al. | 340/825.31 |

OTHER PUBLICATIONS

Caffey et al., The Self-Energized Credential System for the Plutonium Protection System, Dec. 1978.

*Primary Examiner*—Glen R. Swann, III
*Attorney, Agent, or Firm*—Hopgood, Calimafde, Kalil, Blaustein & Judlowe

[57] ABSTRACT

Communication between portal units and identification tags is accomplished by continually radiating an interrogation signal consisting of a code pattern from each portal unit followed by a listening interval. Tags within range of such interrogation signal test the incoming signals for frequency, bit duration, bit rate, a preamble code and a facility identifying code. If the tag receives a valid signal to which it has been preprogramed, such signal synchronizes and initiates a plurality of tag responses within a given overall response interval and with each response transmitted during randomly selected time slot. Each tag is provided with its own pseudorandom binary sequence generator and reply counter with the pseudorandom generator sequenced by a signal derived from the carrier signal radiated by the tag.

The portal units also test incoming signals for frequency bit rate and bit duration as well as for a preamble code generically indicative of a tag. If the test is passed, the remaining tag response consisting of an identifier and an error correcting code is accepted and passed on to a CPU.

22 Claims, 14 Drawing Figures

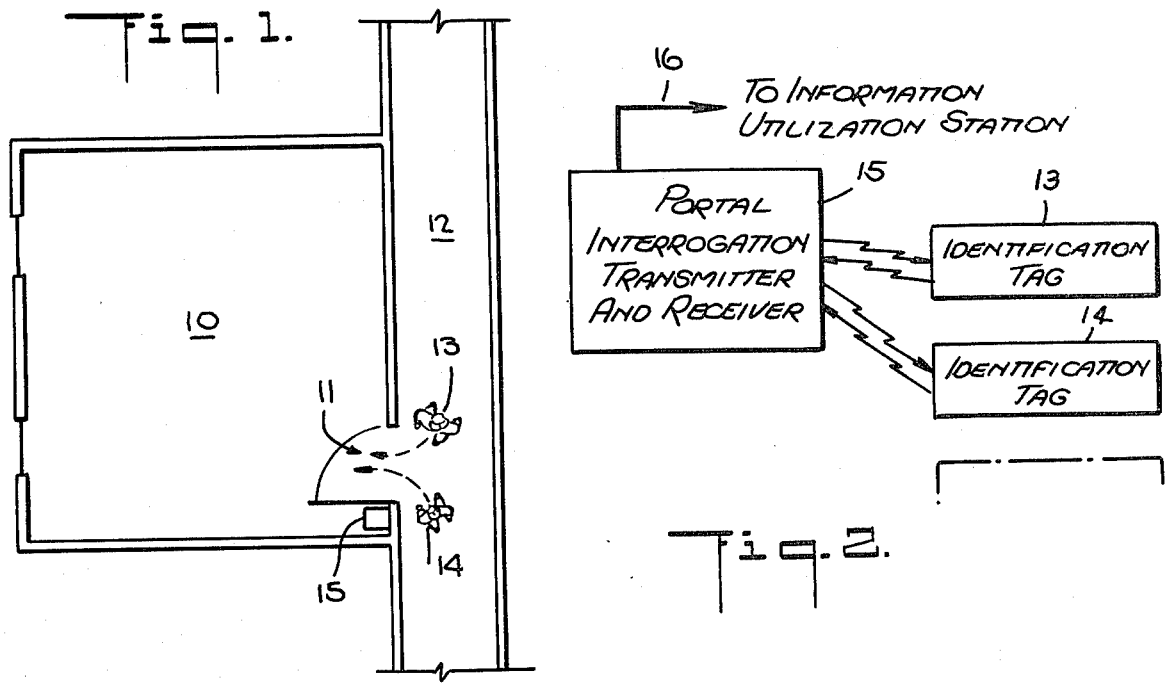
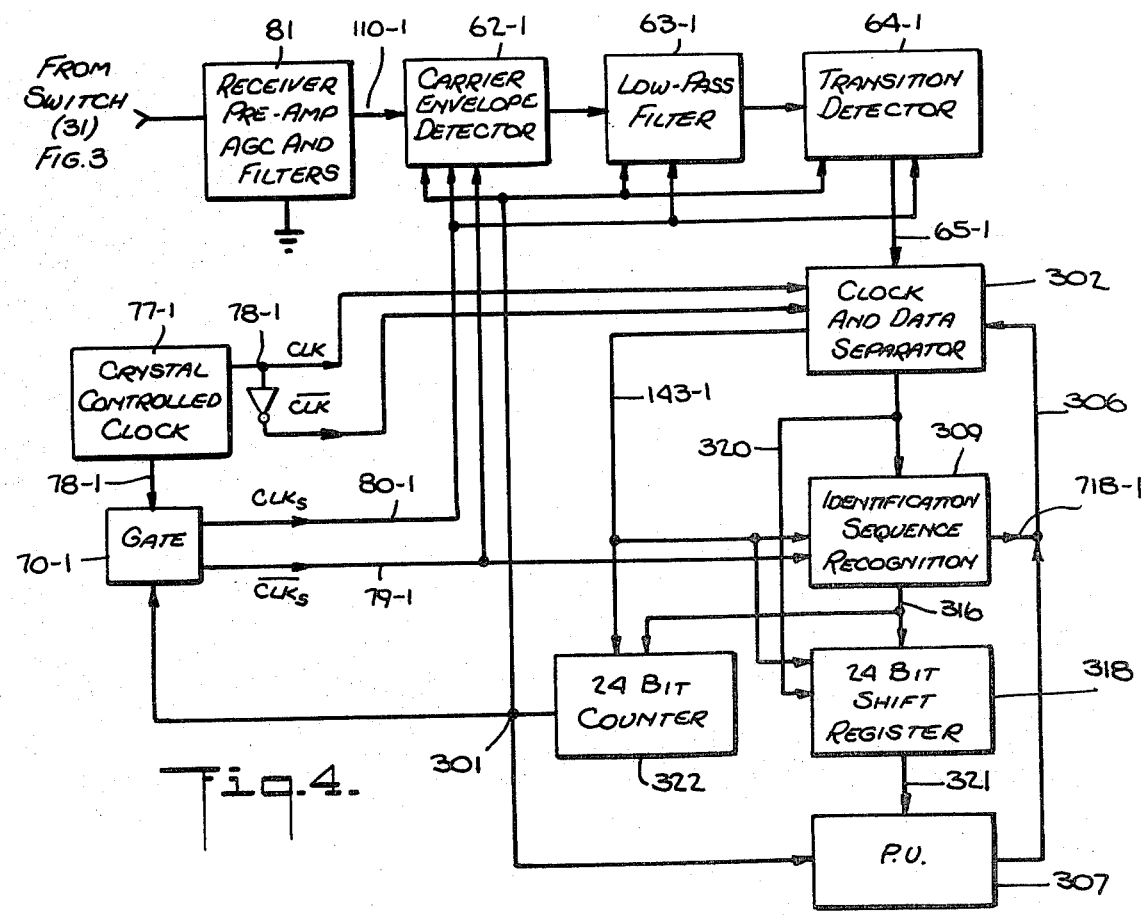

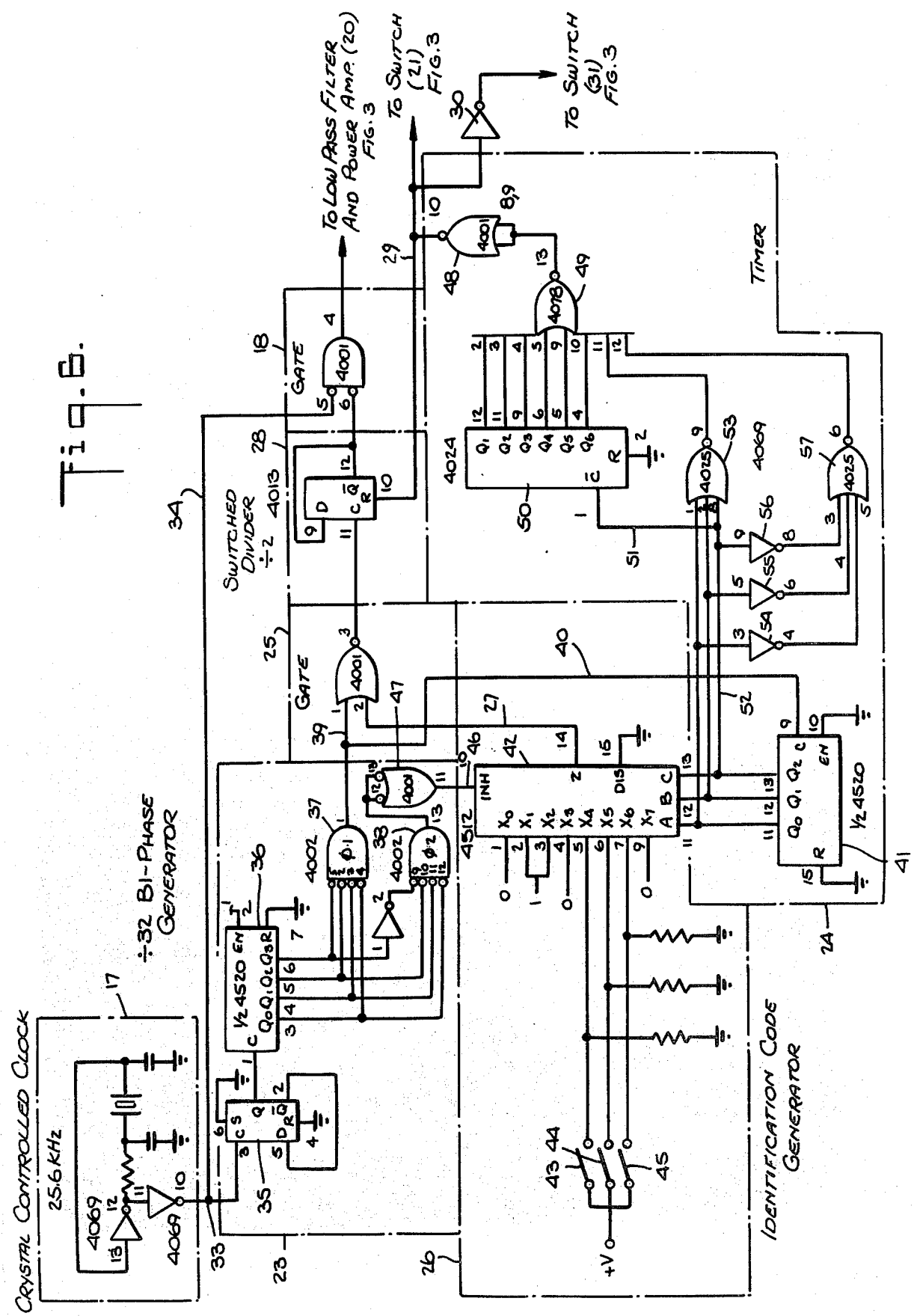

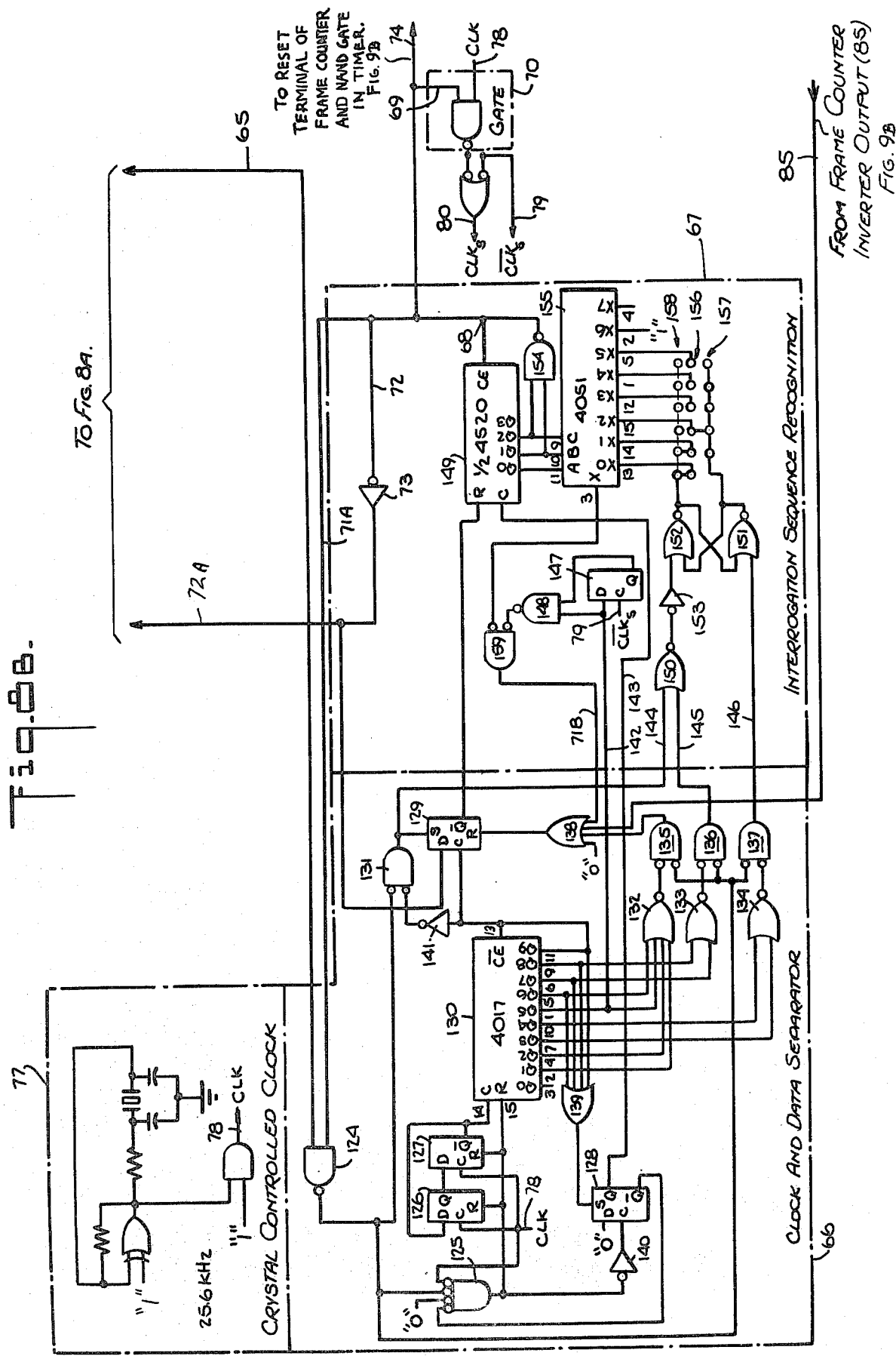

Fig. 9A.
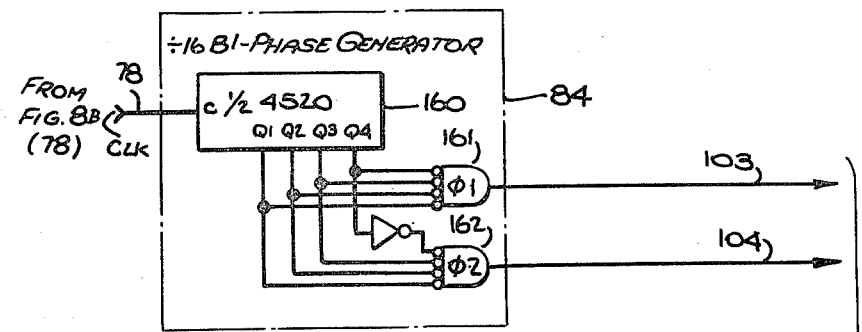
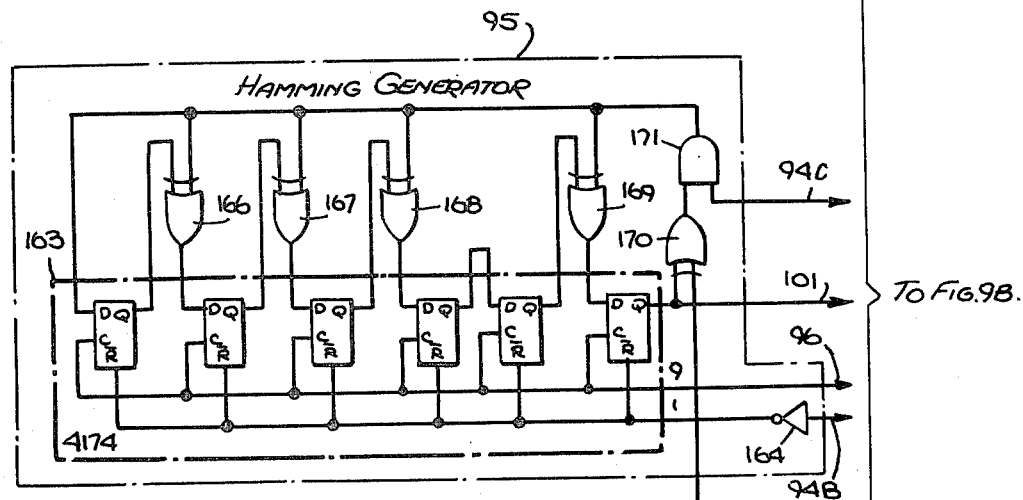
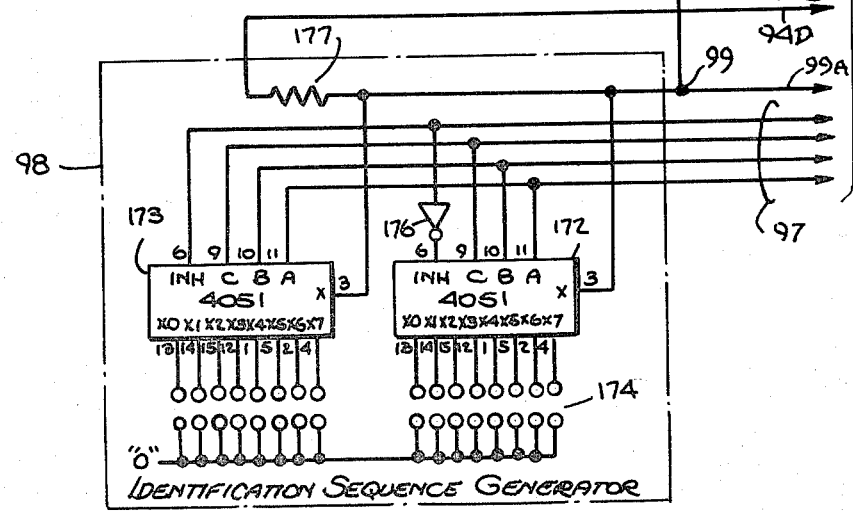

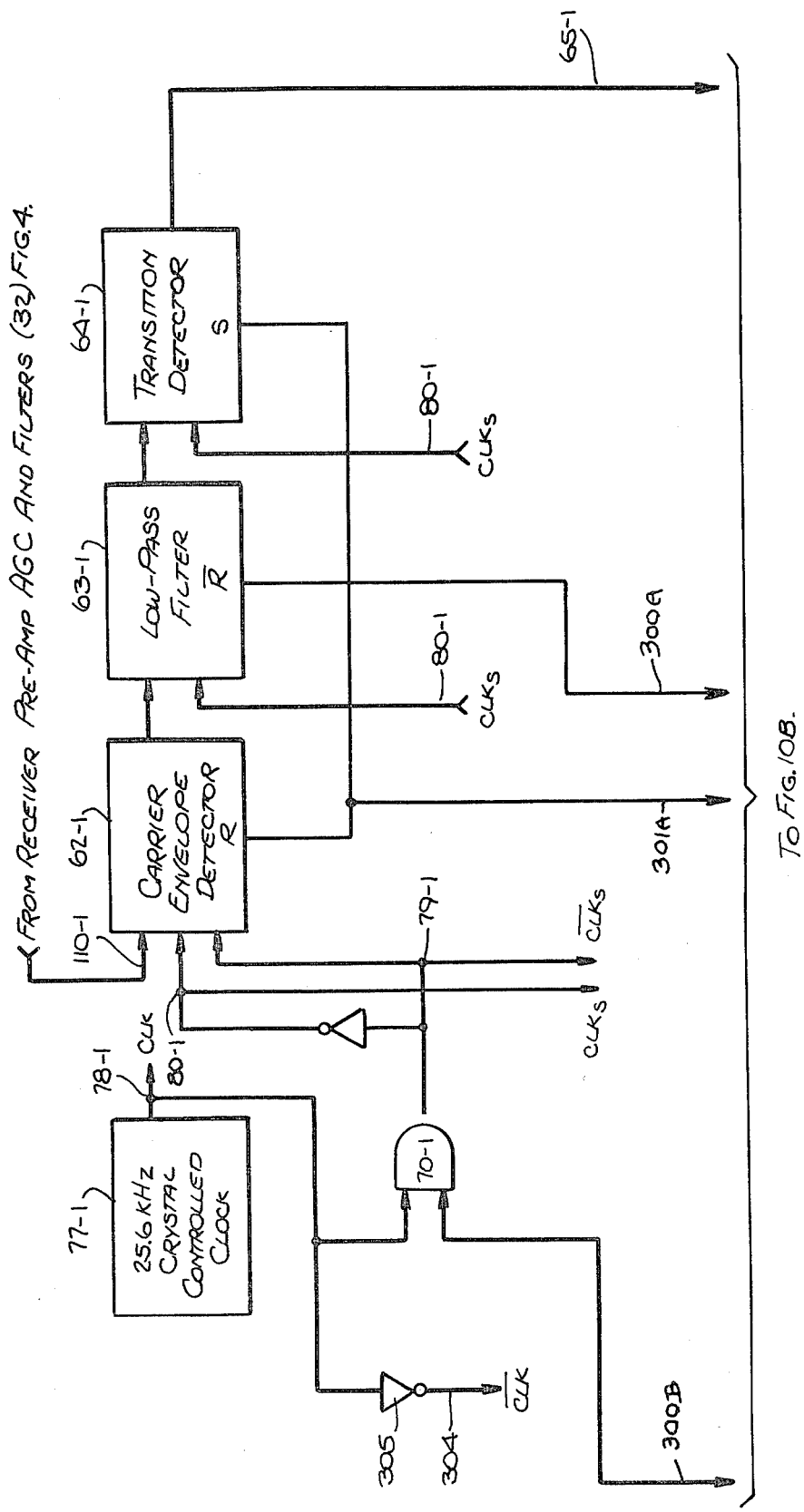

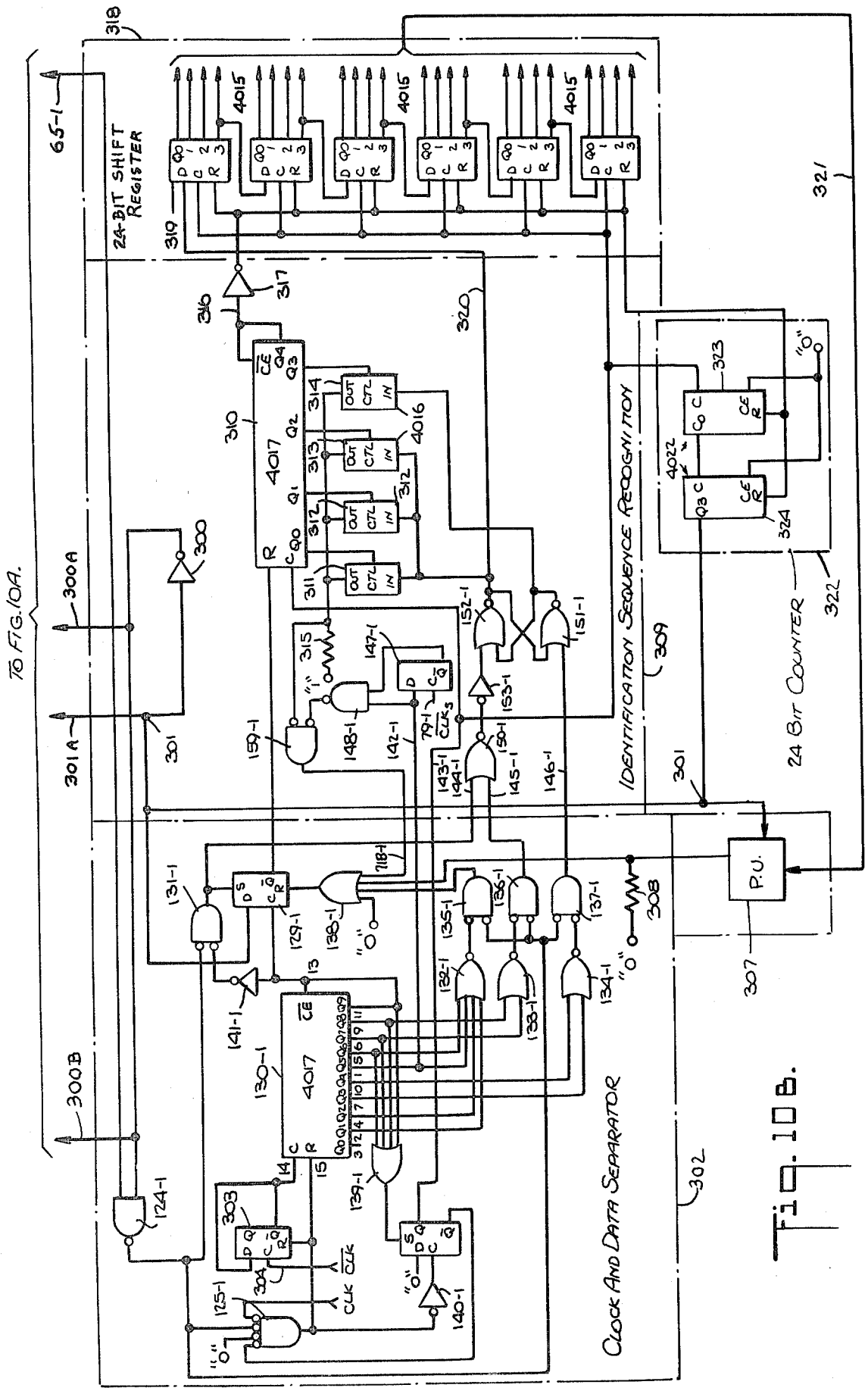

RANDOMIZED TAG TO PORTAL COMMUNICATION SYSTEM

BACKGROUND OF THE INVENTION

The present invention relates to a communication system and more particularly to a system for detecting and identifying one or more of a plurality of independent tag circuits whenever such circuits come within range of a monitoring station. It also relates to the tag circuits per se.

There exist numerous applications for a communication system capable of keeping track of the coming and going and whereabouts of a particular object, whether it be animate or inanimate. Heretofore, systems have been developed for keeping track of vehicles where the vehicles travel comparatively known paths past fixed installations. For example, in U.S. Pat. No. 3,859,624, issued Jan. 7, 1975 to Kriofsky et al., there is described an interrogator-responder arrangement which, according to the patent abstract, employs a responder tag that receives power as the vehicle carrying it approaches the interrogator unit. The power is received through inductive coupling and the responder tag is stated to generate a uniquely coded information field unique to the particular responder tag. The coded information field is received by the interrogator and converted to an information signal representative of the tag. Where the tag is self-powered, the interrogator means does not generate an AC power field and the inductive coupling between tag and interrogator is limited to the coded information field. According to the patent disclosure, the responder tag either operates continuously if self-energized, or whenever it receives transmitted power from an interrogator station. The system utilizes digital techniques and employs a message format for response that consists of 32 bits, the first seven of which represents a synchronization pattern. This is followed by a parity bit and then six groups of 4 bits each in binary coded decimal form providing a 6-digit identification number. The responder tag is held to the barest essentials and only the interrogator is provided with means for validating the signal received from the other.

Responder tags have also been used as part of a credential system for identifying authorized personnel and monitoring passage into or out of a controlled area. A system for that purpose is described in a project report entitled "The Self-Energized Credential System for the Plutonium Protection System" by Thurlow W. H. Caffey and David E. Barnes available from the U.S. Department of Energy, P.O. Box 62, Oak Ridge, Tenn. 37830 under document No. SAND78-2156, printed Dec. 1978. In this system a portal loop transmits a continuous tone at 110 kHz, and the credential transmits an identification code in bursts of a 55 kHz tone. The 55 kHz tone burst is amplified, converted to binary form in the decoder, and tested to see if certain format and parity conditions are met. If the binary code is validated, it is made available for transmission to an operations center. The particular code format incorporates a group of four hexadecimal digits grouped as two pairs with three sync bits and a parity bit added to each pair. The entire code word is 24 bits long. The first digit in each hexadecimal pair is fixed as 1 and 0, respectively, so the first hexadecimal digit is always eight or greater and the third hexadecimal digit does not exceed seven. Because of this coding format and the method used for validation, the number of unambiguous available codes is only 16,192 out of a possible 65,536.

Neither of the systems mentioned above is able to handle the simultaneous passage of more than one responder tag past an interrogator point. This limitation can be tolerated in situations where it is either natural or expected that passage past the control point will be in single file. However, there are many situations where a monitoring function is desired with minimum, if any, intrusion on the normal movement of the carrier. For example, in a hospital it would be extremely useful to be able to know at all times the whereabouts of doctors, nurses and other personnel to facilitate communication with any desired individual. Another purpose of knowing the whereabouts of personnel might be for record purposes to be able to establish when particular personnel were in attendance upon a particular patient or were in an operating room or the pharmacy. The number of uses are limited only by the imagination.

However, where such a system is to be used for documenting whereabouts or for important control it is essential that it reliably detect responder tags passing a monitoring station even though more than one tag might come within range of the station at the same time. The present invention provides just such a system. Moreover, as will appear from the ensuing description, the system in its present embodiment provides for monitoring 65,536 tags through a plurality of portals. It will reliably handle up to 6 tags simultaneously through any one portal.

SUMMARY OF THE INVENTION

In accordance with one aspect of the present invention there is provided a communication system for detecting whenever one or more of a plurality of independent tag circuits comes within range of a monitoring station and identifying such tag circuits as come within said range even though more than one tag circuit may come within said range at the same time, said system comprising means for disposition at said monitoring station for radiating an interrogating signal containing a first code pattern identifiable with said monitoring station; a tag circuit containing means for receiving said interrogating signal whenever said tag circuit is within range of said monitoring station, and means for responding to said interrogating signal, said last mentioned means comprising means for radiating a series of response signals each containing a predetermined second code pattern different from said first code pattern and identifiable with said tag circuit, and means for varying in at least a pseudorandom manner the intervals between successive response signals; and further means for disposition at said monitoring station for receiving and testing any signals that are within range of said station to determine if such last mentioned signals contain a predetermined code pattern identifiable with a tag, and only if such last mentioned code pattern is present, passing on said received signals to a processing unit.

In accordance with another aspect of the present invention there is provided a tag circuit for communicating with and furnishing identification to a monitoring station whenever said tag circuit comes within range of said monitoring station and independent of the simultaneous presence within said range of another tag circuit, said tag circuit comprising means for receiving from said monitoring station an interrogating signal containing a first code pattern when in range of said station, and means for responding to said interrogating signal, said last mentioned means comprising means for radiating a series of response signals each containing a predetermined second code pattern different from said first code pattern and identifiable with said tag circuit, and means for varying in at least a pseudorandum manner the intervals between successive response signals.

BRIEF DESCRIPTION OF THE DRAWINGS

The invention will be better understood after reading the following detailed description of the presently preferred embodiment thereof with reference to the appended drawings in which:

FIG. 1 is a diagrammatic view illustrating the environment within which the present invention may be utilized;

FIG. 2 is a block diagram illustrating the basic components utilized in the system embodying the present invention;

FIG. 4 is a block diagram of the interrogating receiver portion of the portal interrogating transmitter and receiver unit of FIG. 2;

FIG. 6 is a schematic diagram of the components illustrated in FIG. 3;

FIGS. 8A and 8B constitute a schematic diagram of the components illustrated in the receiver portion of the system shown in FIG. 5;

FIGS. 9A and 9B constitute a schematic diagram of the components illustrated in the transmitter portion of the system shown in FIG. 5;

FIGS. 10A and 10B constitute a schematic diagram of the components illustrated in FIG. 4.

The same reference numerals are used throughout the drawings to designate the same or similar parts.

DETAILED DESCRIPTION OF THE PREFERRED EMBODIMENT

Figure 7:
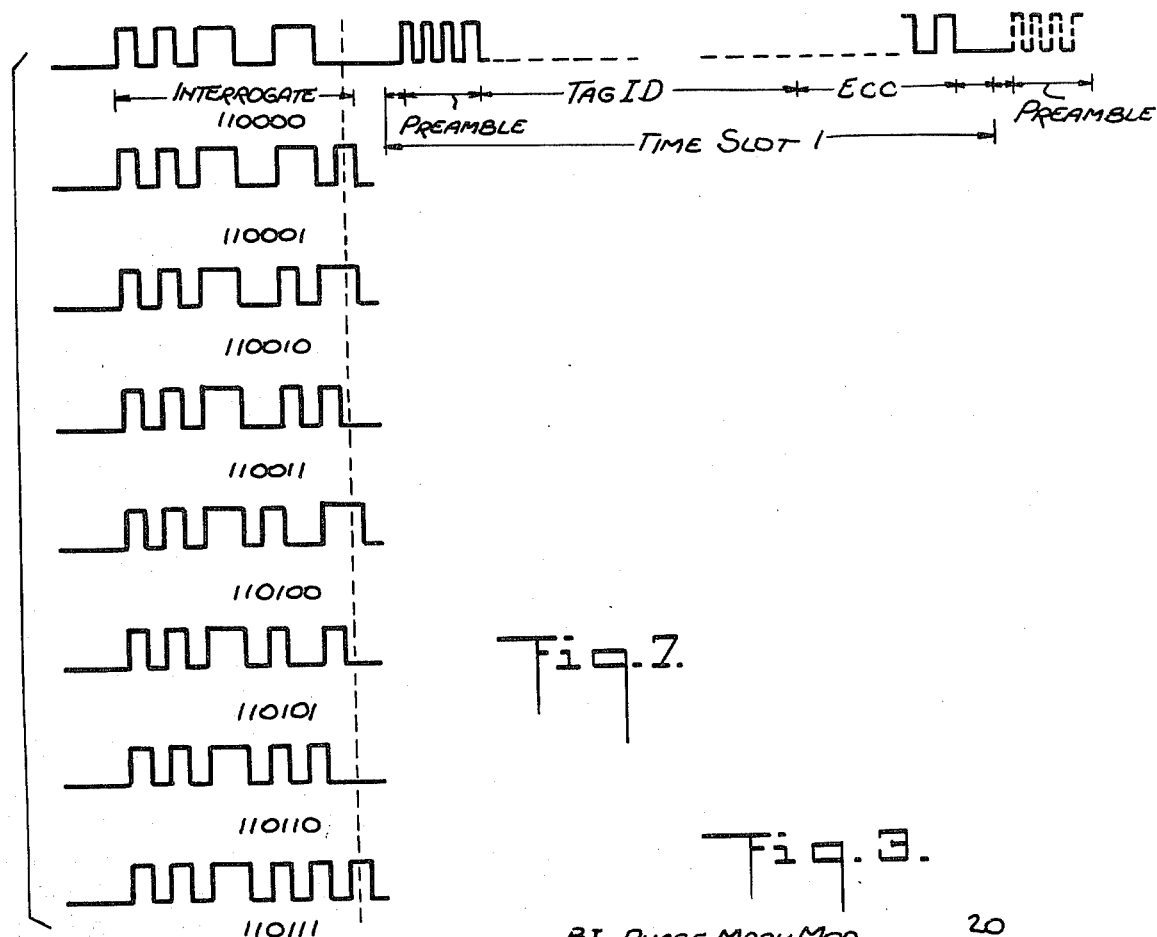
FIG. 7 is a series of timing diagrams useful in describing the operation of the equipment described herein.

Referring now to FIG. 1 there is shown a floor plan representing a room 10 having a doorway 11 opening on a corridor 12. This is merely an arbitrary example for purpose of illustration. It may be assumed that the room 10 is in a hospital, perhaps an operating room, and that it is desired to have a continuous record of when and who has entered or left the room. Two doctors 13 and 14 are about to enter the room 10 almost simultaneously. They could just as well be approaching the doorway 11 from opposite directions, one entering the room 10 as the other is leaving. Located adjacent the doorway 11 is a portal unit 15. As will be explained in greater detail hereinafter, the portal unit 15 is coupled to a magnetic loop, not shown in FIG. 1, but associated with the doorway 11. Each of the doctors 13 and 14 carries a small identification tag, to be described in detail below but not shown in FIG. 1, that interacts with the portal unit 15 through magnetic coupling to the doorway magnetic loop. The portal unit 15 and its associated portal loop may be considered a monitoring station.

The present invention relates to the system for establishing reliable communication between the portal unit and the identification tags. The present invention does not include the downstream apparatus that utilizes the information accumulated by the portal unit. Therefore, to avoid undue complexity, the simplest situation has been assumed for purpose of illustration. It is assumed that whenever an identification tag enters the range of the portal unit 15, the former passes through the doorway. Hence, if we know at any point in time the location of everyone being tracked, an unambiguous signal can be obtained indicative that the particular identification tag has been carried into the room if it was previously known to be in the corridor or was carried out of the room into the corridor if it was known to have been in the room.

The basic components of the system are shown in FIG. 2. The portal unit 15 includes an interrogating transmitter and receiver that communicates with a plurality of identification tags bearing the same reference numerals as the individuals by whom they are carried. The information derived by the portal unit 15 is relayed over an output 16 to an information utilization station. This has not been shown but may be an interface unit to a central processor or the central processor itself.

Figure 3:
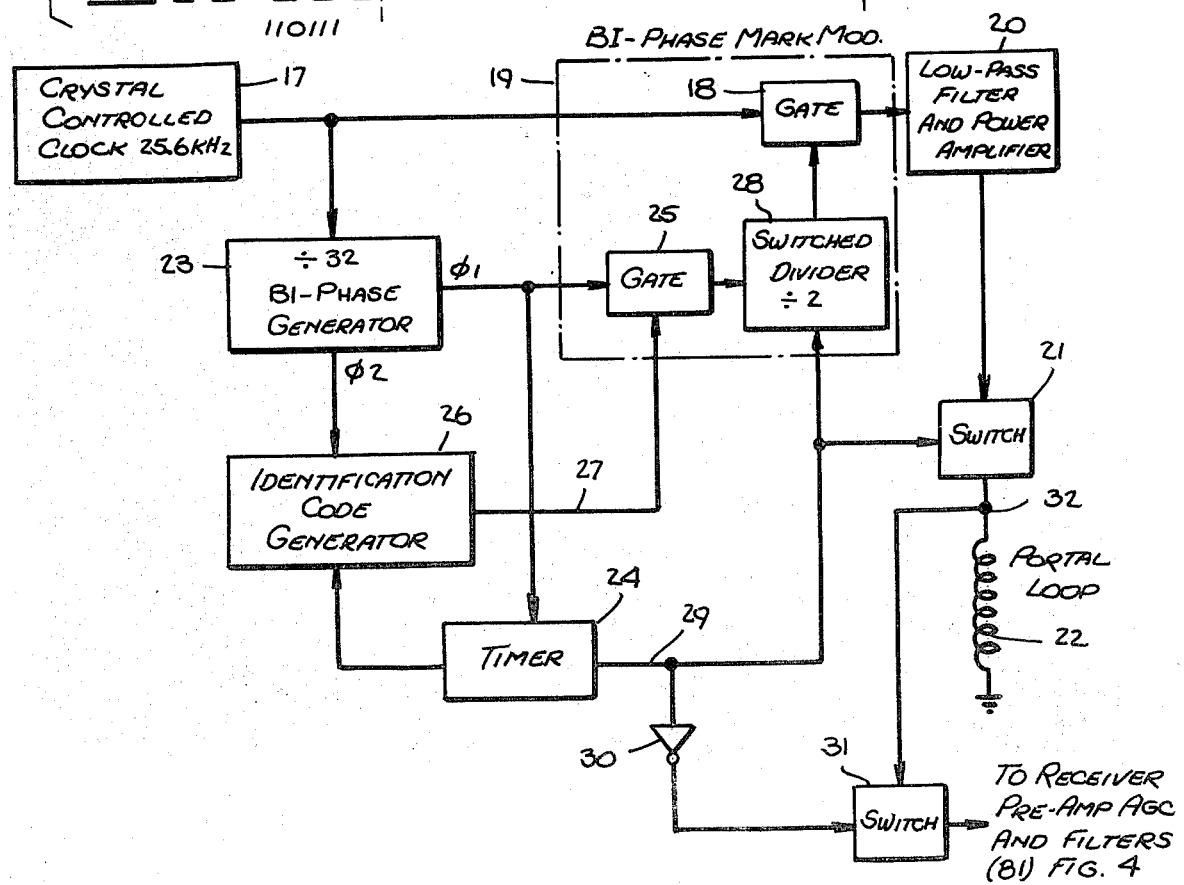
FIG. 3 is a block diagram of the interrogating transmitter portion of the portal interrogating transmitter and receiver unit of FIG. 2.

The portal unit 15 includes a transmitting section shown in block form in FIG. 3 and in detail in FIG. 6 which produces a periodic interrogation signal spaced by intervals of quiet during which the associated receiver section listens for any tag responses. The receiver section is shown in block form in FIG. 4 and in detail in FIGS. 10A and 10B. Each identification tag of FIG. 2 includes a circuit shown in block form in FIG. 5 and in detail in FIGS. 8A, 8B, 9A and 9B.

Referring to FIG. 3, it will be seen that the transmitting section of the portal unit contains a crystal controlled clock 17 producing a carrier signal, e.g., at a frequency of 25.6 kHz, that is fed through a gate 18 in a bi-phase mark modulator or Manchester modulator 19 to a low-pass filter and power amplifier 20. The output from the filter and amplifier 20 is fed through a switch 21 when the latter is conducting or closed circuited to a portal loop 22. The loop 22 would be installed, for example, around the door frame of the doorway 11 in FIG. 1 and arranged to radiate energy to produce a magnetic field within the immediate vicinity of the doorway 11 for interacting with a receiving coil on any identification tags that might come within range of the field produced by the loop 22.

The clock signal output from clock 17 is also furnished to a divider/bi-phase generator 23 where it is divided by 32 and split in phase to provide two pulse trains. It is an oversimplification to view the output signals from the generator 23 as simply phase shifted versions of a true frequency divided signal. As will be evident from the detailed circuit shown in FIG. 6, the 25.6 kHz clock output is divided by two and is then scaled down in a binary counter to produce pulses having a duration equal to two complete cycles of the 25.6 kHz signal, i.e., a time duration of 78.125 $\mu$Sec. The latter pulses repeat at a pulse repetition rate of 800 pps with the pulses in one output, say phase 1, occurring 0.625 mSec from those in the phase 2 output. The signal output from biphase generator 23 that has arbitrarily been designated as phase 1 is fed both to a timer 24 and to another gate 25 in the modulator 19. The second phase output from generator 23 is fed to an identification code generator 26 that is also furnished with an output from timer 24. The code generator 26 is clocked by the signal from generator 23 and sequenced by the timer output to produce a signal fed over output 27 to control the gate 25 whose output is fed to a switched divider 28. When the switched divider 28 is enabled by a signal from timer 24 over output 29, the divider feeds a signal from gate 25 divided by two to the gate 18. Collectively the gates 18 and 25 and divider 28 constitute a bi-phase mark modulator passing a pulse modulated carrier signal from clock 17 to filter amplifier 20. At the same time the enabling signal from timer 24 on output 29 is applied to switch 21 to render it conducting thereby passing the modulated signal to portal loop 22.

While the transmitting section is sending out an interrogating signal it is desired that the receiving section be disconnected from the portal loop 22, shared in common, and this function is accomplished by feeding the signal from timer output 29 through an inverter 30 to another switch 31 so as to render the latter non-conducting. As shown, the input to switch 31 is obtained from the junction 32 with the portal loop 22 and is fed to a receiver preamplifier AGC and filter circuit 81 in FIG. 4.

Before describing the receiver section of the portal unit it may be helpful to consider the portal transmitting section in greater detail, then consider the construction and operation of the tag circuits, followed by a consideration of the portal receiving section. Communication between the identification tags and the portal unit occurs at a frequency of 25.6 kHz with an interrogate-response format. As noted above with reference to FIG. 3, information is modulated onto the 25.6 kHz carrier frequency utilizing self-clocking bi-phase mark modulation. Interrogate information occurs at a rate of 800 bits per second, with a message length of six bits. The first three bits follow a fixed pattern of 110, and the remaining three bits are used to provide a facility identifier to the tags, the three bits providing for eight different code patterns. Utilizing a bi-phase mark format, the interrogate patterns will appear as shown in FIG. 7. As will be explained hereinafter, the interrogate sequence occupies a time period of 7.5 mSec. Any identification tag within range of the portal unit will receive the information from the portal unit contained in the interrogate sequence. The tag circuit will check for the proper frequency, the proper bit rate, the preamble sequence of 110, and for the 3-bit facility identifier to which it is preprogrammed before it assumes that it must respond. Response information returning from an identification tag to the portal unit occurs at a rate of 1600 bits per second, with a message length of 28 bits. The first four bits follow a fixed pattern of 1110, the next 16 bits indicate the identity of the tag, the next 6 bits contain an error checking code, and the last 2 bits are presently reserved and contain 00. The portal unit receives the information from an identification tag, checks for the proper frequency, the proper bit rate, the preamble sequence of 1110, then effects a preliminary acceptance of the identifier, error checking code and following 00 pattern.

The format for a tag response is also shown in FIG. 7 on the first line thereof. The format involves a preamble transmission of 2.5 mSec duration, a tag identification transmission of 10 mSec duration, an error correction code occupying 5 mSec followed by a 1.25 mSec pause. These time intervals along with a pretransmission format pause of 0.625 mSec provides an overall time slot interval or duration of 19.375 mSec. There are 32 such time slots in one complete tag trasmission cycle for a total time of 620 mSec. To this is added a post time delay of 11.5625 mSec and a pre-response pause of 0.9375 mSec making up a complete cycle of 632.5 mSec.

Referring now to FIG. 6, it will be seen that the crystal controlled clock 17 consists of a conventional crystal controlled oscillator providing a pulse output at terminal 33. This signal is fed directly over a connection 34 to one input of the NOR GATE 18. The signal at terminal 33 is also fed to the clock terminal of a D flip-flop 35, connected as shown, within the bi-phase generator 23. As so connected, the flip-flop 35 divides by 2 the signal obtained from the clock 17. Thus, an output signal from the Q output of flip-flop 35 is fed to the clock input of a binary counter 36. The Q0 through Q3 output terminals of the counter 36 are connected, as shown, to the inputs of the two NOR GATES 37 and 38. NOR GATE 37 has its output connected over lead 39 to one input of the gate 25. Another lead 40 connects the output from gate 37 to the clock input terminal of a binary counter 41 in the timer 24. Counter 41 has its Q0 to Q2 outputs connected, respectively, to the A, B, and C inputs of an 8-channel data selector 42. The X inputs to the data selector are used to set up the preamble and identification codes for the facility. As shown in FIG. 6, the X1 and X2 inputs are connected to a voltage source representing a high or logical 1 condition. The X3 terminal is connected to a voltage representing the logical 0 condition while terminals X4, X5 and X6 are connected to individual selector switches 43, 44 and 45 which enable the identification code for the portal unit to be preselected to one of the eight alternatives indicated in FIG. 7. It will be understood that when the switches 43, 44 and 45 are in the open position as shown in the drawing each of the terminals to which they are connected are equivalently connected to the logical 0 level. If it is desired to connect the particular input terminal of the data selector to a logical 1 value, its respective switch should be closed connecting it to the positive voltage source. The X0 and X7 terminals are provided for introducing a guard interval or space both before and after the code pattern in order to insure against certain types of interference. These terminals are shown connected to the low voltage or logical 0 value.

The data selector 42 is also provided with an inhibit input terminal to which is connected over lead 46 the output from a NAND GATE 47 whose input is connected together and to the output from NOR GATE 38. NAND GATE 47 inverts the output from NOR GATE 38 inhibiting the data selector 42 except for the brief interval during which an output pulse is derived from the second phase of the bi-phase generator 23. At such instance, the Z output terminal of the data selector is connected to whichever input terminal is determined by the binary signals applied to its ABC input terminals from the counter 41. These signals are applied over connection 27 to the other input of gate 25.

The output from NOR GATE 25 is fed to the clock input of a D flip-flop constituting the switch divider 28. The D flip-flop 28 is connected as shown with its $\overline{Q}$ output connected both to its D input and to an input of NOR GATE 18. The reset terminal of the D flip-flop 28 is connected to the output 29 from the timer 24 which output is derived from a NOR GATE 48. NOR GATE 48 functions as an inverter having both of its inputs connected together and to the output from a multiple input NOR GATE 49. Six of the inputs to NOR GATE 49 are coupled, respectively, to the Q1 to Q6 outputs of the 7-stage ripple counter 50. The reset terminal of said counter is connected to ground while the clock input is connected over leads 51 and 52 to the Q2 output of counter 41. Since the Q2 output of counter 41 will alter its condition once for every eight input pulses received at its clock terminal from the output 39 of the bi-phase generator 23, the signal applied to the ripple counter 50 will represent the signal out of gate 37 divided by eight.

One further input to NOR GATE 49 is derived from the output of a NOR GATE 53 whose three inputs are connected to the three outputs of counter 41. The same three outputs of counter 41 are connected through respective inverters 54, 55 and 56 to the three inputs of a further NOR GATE 57. The output of NOR GATE 57 is connected to one further input of NOR GATE 49.

The four-digit numbers appended to the various logic components shown in FIG. 6 represent the CMOS type numbers and, thereby, completely identify the parts in question. It is believed that the individuals skilled in the subject art will now be able to understand the complete operation of the portal transmitter section described with reference to FIG. 6. It is observed that the switched divider 28 is inhibited from operating so long as its reset terminal has a logical 1 applied to it over lead 29. This will occur anytime any one of the inputs to the NOR GATE 49 contain a logical 1 signal. Analysis of the circuit will show that when it operates from a 25.6 kHz clock the transmission window for the 6-bit code will occupy an interval of 7.5 mSec. while the silent time will occupy an interval of 632.5 mSec. It is during the latter interval that a signal is applied through inverter 30 to switch 31 in FIG. 3 for rendering it conductive to enable the receiver circuit illustrated in FIG. 4 to operate. Whether or not an identification tag comes within range of a given portal unit, the portal unit will continue to transmit periodically an interrogation signal and then listen for a reply. If any reply occurs during the listening interval it will be verified and recorded. If no reply is heard the operation will nevertheless continue.

Figure 5:
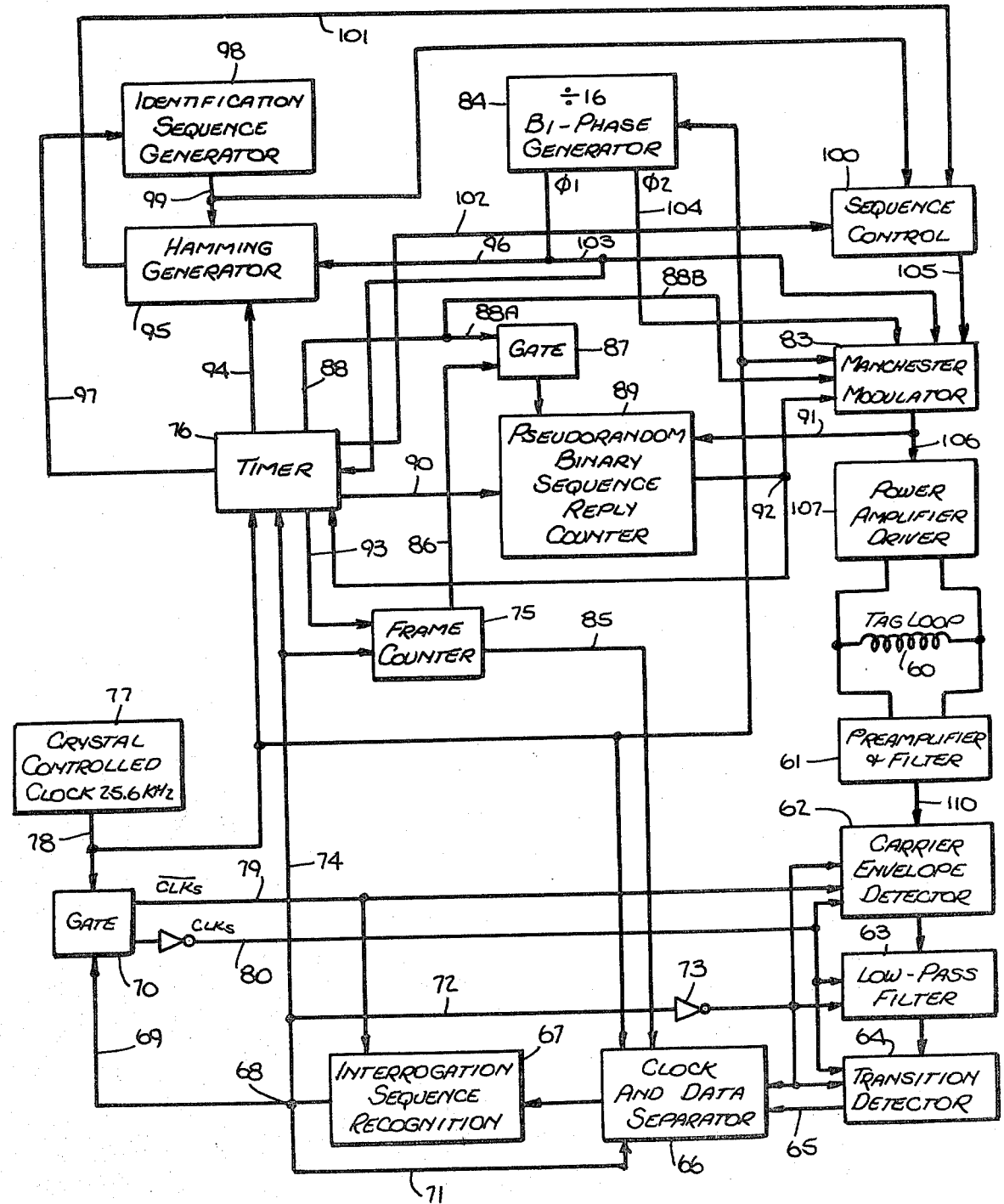
FIG. 5 is a block diagram of the circuit incorporated in the identification tag of the system illustrated in FIG. 2.
Figure 8A:
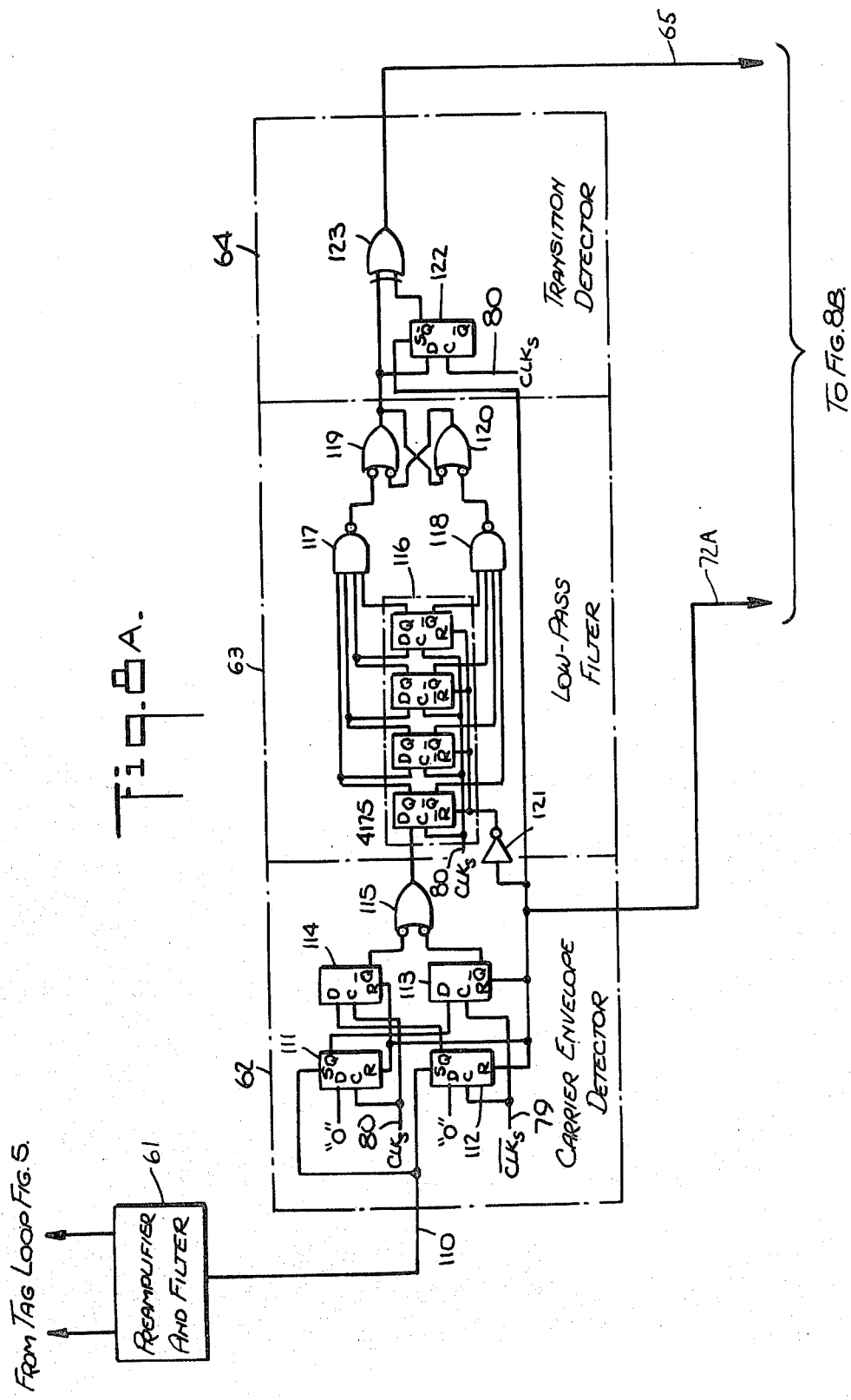

The identification tags for use with the present system are small, battery operated, solid state circuit devices having their own antenna loops for coupling to the portal loops. Referring to FIG. 5, the circuit contained in an identification tag is illustrated in block diagram form. It contains a tag loop 60 operative both for reception and transmission whose terminals are connected for reception to a preamplifier and filter circuit 61 whose output feeds a carrier envelope detector 62. The output of the carrier envelope detector is passed through a low-pass filter 63 to a transition detector 64. From transition detector 64 a detected output is fed over a path 65 to a clock and data separator 66 whose output is then fed to an interrogation sequence recognition circuit 67. The output from the interrogation sequence recognition circuit 67 is fed to a junction 68 where it is connected over lead 69 to an input to gate circuit 70 and over a lead 71 back to the clock and data separator 66. Junction 68 is also connected over a lead 72 through an inverter 73 to an input of each of the circuits 62, 63, 64 and 66. Finally, the junction 68 is connected over lead 74 to an input to a frame counter 75 and a timer 76.

A crystal controlled clock 77 having a frequency of 25.6 kHz has an output coupled over lead 78 to the gate 70 for providing the switched clock signal on leads 79 and 80. The switched clock signal on lead 79 is fed both to the interrogation sequence recognition circuit 67 and to the carrier envelope detector 62. The switched clock signal on lead 80 is connected to each of the circuits 62, 63 and 64. In addition, the clock 77 has a direct output connected from lead 78 to the timer 76, the clock and data separator 66, a Manchester modulator 83, and a bi-phase generator 84. The latter divides the signal from clock 77 by 16. The frame counter 75 has one output connected over lead 85 to the clock and data separator 66 and another output connected over lead 86 to an input to gate 87. The second input to gate 87 is derived over leads 88 and 88A from the timer 76. The output from gate 87 feeds an input to a pseudorandom binary sequence reply counter 89. The reply counter 89 also receives an input over a lead 90 from the timer 76 and an input over the lead 91 from the Manchester modulator 83. The output from the reply counter 89 is furnished to a junction 92 for connection to inputs to the Manchester modulator 83 and the timer 76. Timer 76 also provides an output over lead 93 to the frame counter 75 and another output over lead 94 to a Hamming generator 95. The Hamming generator 95 has an additional input obtained from the $\phi 1$ output of generator 84 over the lead 96. Another circuit is completed from timer 76 over an output 97 through an identification sequence generator 98 to the Hamming generator 95. The output from sequence generator 98 is also connected over lead 99 to one input of a sequence control circuit 100. A second input to sequence control circuit 100 is derived over lead 101 from the Hamming generator 95. Finally, a third input to the sequence control circuit 100 is derived over lead 102 from the timer 76.

As further shown in FIG. 5 the $\phi 1$ output from the biphase generator 84 is also connected over lead 103 to the Manchester modulator 83. The $\phi 2$ output from the generator 84 is connected over a lead 104 to an input of the Manchester modulator 83. Another input to the Manchester modulator 83 is derived over lead 105 from the sequence control circuit 100. The output from the Manchester modulator 83 is furnished over lead 106 to the power amplifier driver 107 whose output is connected across the tag loop 60.

Having described the identification tag circuitry in general terms with reference to FIG. 5, attention should be directed to FIGS. 8A, 8B, 9A and 9B for a more detailed explanation of the implementation of the functional components contained in the circuit of FIG. 5. Commencing with FIGS. 8A and 8B the crystal controlled clock circuit 77 is shown as of conventional construction having a clock output 78 as previously noted. Signals received by the tag loop 60 (see FIG. 5) are coupled through the preamplifier and filter circuit 61 over a lead 110 to the set inputs of two D flip-flops 111 and 112 in the carrier envelope detector 62. As shown, the switched clocking signals on leads 79 and 80 are connected, respectively, to the clock inputs of flip-flops 112 and 111. In addition, the input 79 is connected to a clock input of a further D flip-flop 113 while the input 80 is connected to the clock input of another D flip-flop 114. All of the reset terminals of flip-flops 111, 112, 113 and 114 are connected over lead 72A to the output of the inverter 73 in the interrogation sequence recognition circuit 67. The D inputs to flip-flops 111 and 112 are connected to logical 0 voltage levels while the Q output of flip-flop 111 is connected to the D input of flip-flop 113 and the Q output of flip-flop 112 is connected to the D input of flip-flop 114. The $\overline{Q}$ outputs from flip-flops 113 and 114 are connected to the inputs of a NAND GATE 115 whose output represents the output from the carrier envelope detector 62.

The low-pass filter 63 consists of a type 4175 quad type D flip-flop 116 and four NAND GATES 117, 118, 119 and 120. The elements 116 through 120 are interconnected as shown in the drawings. All of the clock inputs of the flip-flop components of the quad flip-flop 116 are connected to the switched clock line 80 while all of the reset terminals are connected to the output of an inverter 121 whose input is connected over lead 72A to the output of inverter 73. The output from NAND GATE 119 constitutes the output from the low-pass filter 63 and it is fed to both the D input of a D flip-flop 122 in the transition detector 64 and one input of an EXCLUSIVE OR GATE 123. The clock input of flip-flop 122 is connected to the switched clock line 80 while its Q output is connected to the other input of the EXCLUSIVE OR GATE 123. The output from the gate 123 represents the output of the transition detector and is furnished over lead 65 to one input of a NAND GATE 124. The latter gate is located in the clock and data separator 66.

The other input to the NAND GATE 124 is obtained from the output of the interrogation sequence recognition circuit 67 over line 71A. The clock and data separator 66 also contains a NOR GATE 125, four D flip-flops 126, 127, 128 and 129, a type 4017 decade counter 130, NOR GATES 131, 132, 133, 134, 135, 136 and 137, OR GATES 138 and 139, and inverters 140 and 141. The various components are interconnected as shown in the drawing by conventional symbology.

The clock and data separator 66 has a series of output leads 142, 143, 144, 145 and 146 leading to the interrogation sequence recognition circuit 67. Lead 142 is coupled from the Q5 output of counter 130 to a D input of a D flip-flop 147. It is also connected to one input of a NAND GATE 148. The lead 143 is connected from the Q output of flip-flop 128 in clock and data separator 66 to the clock input of a binary counter 149. Lead 144 is coupled between the output of the NOR GATE 131 and an input to the NOR GATE 150. The second input to NOR GATE 150 is obtained by lead 145 coupled to the output of gate 136. Lead 146 is coupled from the output of gate 137 to the input of a NOR GATE 151 that is cross-coupled to another NOR GATE 152, as shown. An inverter 153 interconnects the output of gate 150 with an input of gate 152. The output from counter 149 is coupled as shown in the drawing to the two inputs of a NAND GATE 154 and to the A, B and C inputs of a type 4051 analog multiplexer/demultiplexer 155. The latter is an 8-channel device whose output terminals X0 through X5 are connected to respective strapping terminals 156 for selective interconnection with a corresponding terminal in either of the sets 157 or 158. As shown in the drawing, the strapping terminals 156 that are connected to outputs X0 and X1 of the device 155 are connected to terminals in the set 158 while the output X2 is connected to a terminal in the set 157. These represent fixed connections to predetermine the 110 preamble used as part of the portal identification sequence. It will be understood that the remaining strapping terminals that are connected to the output X3, X4 and X5 would be connected either to the set 157 or 158 depending upon the identification code used for the particular facility in which the identification tag is to be employed. The X6 terminal of the device 155 is connected to a logical 1 potential applying a blocking signal to one input of the NOR GATE 159 after a 6-bit interrogation signal from a portal has been recognized. As shown in the drawing, the output from gate 159 is coupled to one input of the OR GATE 138 in the clock and data separator which constitutes part of the reset section of the component 66. Discussion of the operation of the circuit described with reference to FIGS. 8A and 8B will be deferred until the details of FIGS. 9A and 9B have been considered to which attention should now be directed.

Figure 9B:
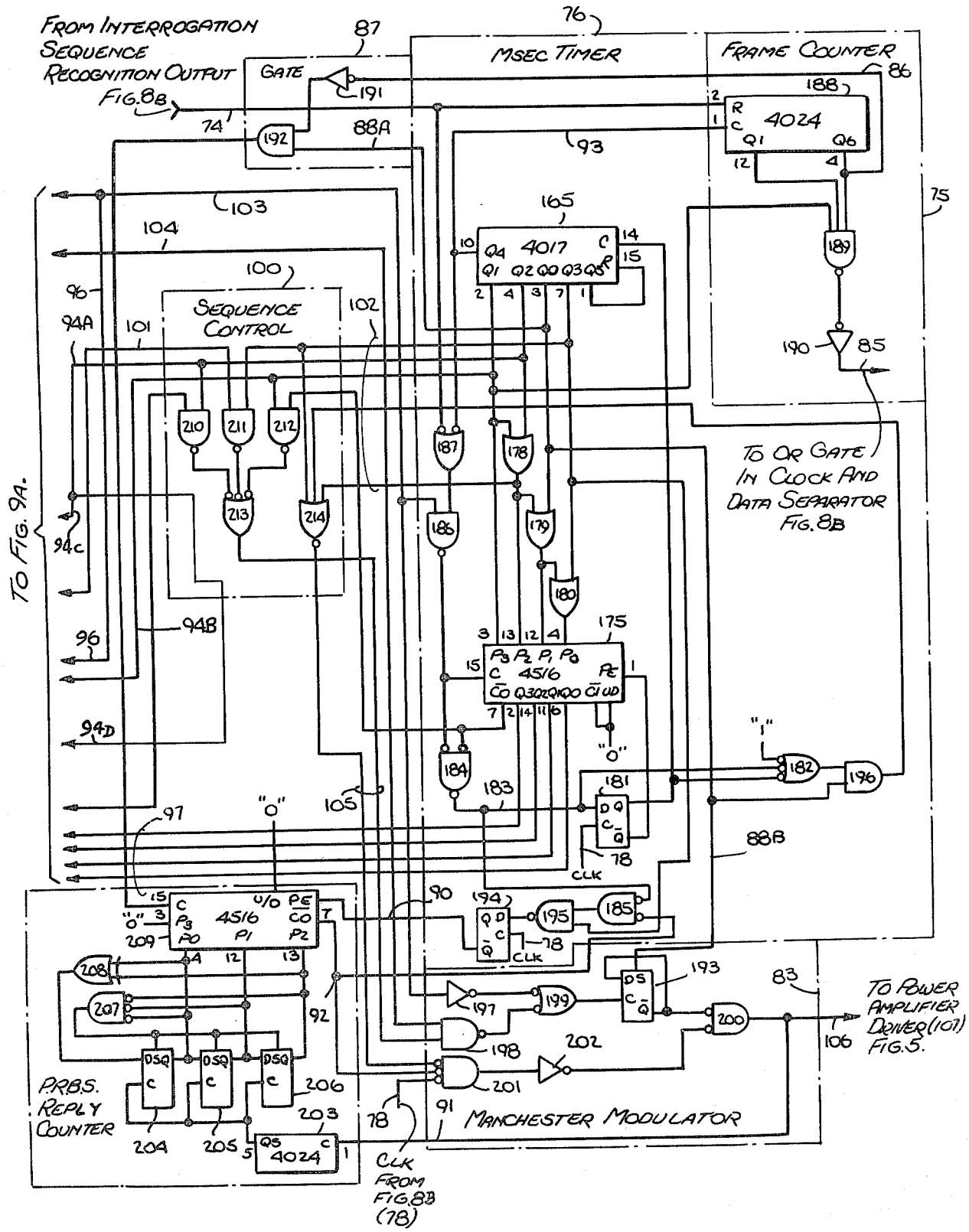

Referring to FIGS. 9A and 9B it will be seen that the divide by 16 bi-phase generator 84 consists of a binary counter 160 having its outputs coupled to a pair of NOR GATES 161 and 162. The output from gate 161 is referred to as phase 1 while the output from gate 162 is referred to as phase 2. As shown, the $\phi 1$ output is connected by lead 96 to the clock terminals of the individual flip-flop components in the type 4174 hex type D flip-flop 163 in the Hamming generator 95. As shown, all of the reset terminals of the flip-flops in component 163 are connected to the output of an inverter 164 whose input is fed over lead 94B coming from the Q1 output of a type 4017 decade counter/divider 165 in timer 76. The Hamming generator 95 also includes five EXCLUSIVE OR GATES 166, 167, 168, 169 and 170 and an AND GATE 171, all connected as illustrated in the drawing. The control input to EXCLUSIVE OR GATE 170 is derived from junction 99 at the output of the identification sequence generator 98 while the control input for the AND GATE 171 is derived over leads 94A and 94C from the Q2 output of the decade counter/divider 165.

The identification sequence generator 98 consists of two type 4051 8-channel analog multiplexer/demultiplexer components 172 and 173. A set of pairs of terminals 174 to which straps or jumpers can be connected are provided with one terminal of each pair connected to the respective X0 to X7 output of the components 172 or 173 while the other terminals of each pair are joined together and connected to the logical 0 voltage level. An open circuit between any pair of the set of terminals 174 represents a logical 1 condition while a strap bridging a pair of terminals introduces a logical 0 condition. The control inputs for the components 172 and 173 in the identification sequence generator 98 are obtained from the timer 76. Specifically, the timer 76 contains a type 4516 binary up/down counter 175 whose Q0 through Q3 outputs are connected by cable 97, respectively, to the A, B, C, and inhibit terminals of the analog multiplexers 172 and 173 with the single exception that the connection to the inhibit terminal of multiplexer 172 is passed through an inverter 176. As is well known, four binary bits have the capacity of designating 16 different conditions and the inverter 176 provides for the multiplexer 172 cycling during the first eight counts from the binary counter 175 while the multiplexer 173 cycles for the subsequent eight counts. Collectively, the multiplexers 172 and 173 provide for the sequential selection of 16 different bit values to constitute an identification code.

The X outputs from the multiplexers 172 and 173 in the identification sequence generator 98 are connected together and to the junction 99 as well as through a resister 177 over lead 94D to the junction between leads 94A and 94C.

The Q0 through Q3 outputs of the decade counter 165 in the timer 76 are connected through a series of OR GATES 178, 179 and 180 to the P0 through P3 inputs of the binary up/down counter 175. Both the carry in terminal and the up/down terminal of the counter 175 are tied to the logical 0 voltage level. This causes counter 175 to operate as a down counter. The preset enable or PE terminal of the counter 175 is connected to the $\overline{Q}$ output terminal of a D flip-flop 181. The Q output of flip-flop 181 is connected to the clock terminal of the counter 165 and to one of the inputs of a NAND GATE 182. A second input to gate 182 is derived from lead 183 connected to the output of an OR GATE 184. This lead 183 is also connected to the D input of flip-flop 181 and to an input to the NOR GATE 185.

One of the inputs to gate 184 is connected to the carry out, $\overline{CO}$ output of the counter 175 while the other input to the gate 184 is connected to the output of a NAND GATE 186. The clock terminal to the counter 175 is also connected to the output of gate 186. The inputs to gate 186 are obtained, one from the lead 103 and the other from the output of a NAND GATE 187. The two inputs to the gate 187 are obtained, one from the lead 74 and the other from the Q4 output of counter 165. Lead 74 is also connected to the reset terminal of a type 4024 7-stage ripple counter 188 in the frame counter circuit 75. The clock terminal of said ripple counter 188 is connected to the lead 93 connected to the Q4 output of counter 165.

In the frame counter 75 the Q1 and Q6 output terminals of the ripple counter 188 are connected to two of the inputs to a NAND GATE 189 whose output passes through an inverter 190 to the output lead 85. The third input to gate 189 is obtained from the Q1 output of counter 165 in the timer 76. The Q6 output of the counter 188 in the frame counter 75 is also connected over lead 86 to the inverter 191 in the gate circuit 87. The output of inverter 191 is coupled to one input of an AND GATE 192 whose second input is derived from a lead 88A coupled to the Q0 output of counter 165. The Q0 output of counter 165 is also connected over lead 88B to the set input of a D flip-flop 193 in the Manchester modulator 83. The remaining components constituting the timer circuit 76 consists of a D flip-flop 194, a NAND GATE 195 and an AND GATE 196 all connected as shown in the drawing.

The Manchester modulator 83 includes an inverter 197, NAND GATES 198 and 199, NOR GATES 200 and 201 and another inverter 202. These components are all interconnected as shown in the drawings.

The pseudorandum binary sequence reply counter 89 includes a type 4024 7-stage ripple counter 203 whose clock input is coupled to lead 91 coming from the output of the Manchester modulator 83 and whose Q5 output is connected to the clock input of three D flip-flops 204, 205 and 206. The Q output terminals of the respective flip-flops 204, 205 and 206 are connected to the inputs of a NOR GATE 207 whose output is connected to each of the Set terminals of the flip-flops for the purpose of inhibiting said flip-flop from simultaneously assuming the reset condition that would be equivalent to a binary count of zero. In addition, the Q outputs from the flip-flops 204 and 206 are connected to respective inputs of an EXCLUSIVE OR GATE 208 whose output is coupled to the D input of flip-flop 204. Thus, the three flip-flops 204, 205 and 206 are interconnected in a pseudorandum binary sequence counting arrangement. For this particular example the counting sequence is 7, 6, 5, 2, 4, 1, 3. The next count is 7 and the sequence repeats ad infinitum. The reply counter is furnished by a type 4516 binary up/down counter 209 whose preset terminals P0, P1 and P2 are coupled to the Q outputs, respectively, of flip-flops 204, 205 and 206. The carry out terminal ($\overline{CO}$) of counter 209 is connected to the junction 92 from which connections are made to gate 201 and gate 185. The counter 209 also includes a preset enable (PE) terminal connected to the lead 90 from the $\overline{Q}$ output of flip-flop 194 in timer 76. The clock terminal of counter 209 is coupled to the output of gate 192 while the P3 preset terminal is connected to a logical 0 potential value.

The sequence control 100 includes NAND GATES 210, 211, 212 and 213 as well as a NOR GATE 214, all connected as shown in the drawings.

As described above with reference to FIGS. 3 and 6, the portal unit periodically radiates an interrogation signal containing a 6-bit digital identification code pattern. Whenever an identification tag is within range of a portal unit its tag loop will pick up a signal that is fed to its preamplifier and filter 61. From there it proceeds to the carrier envelope detector which converts the pulse train information into a logic level output removing any signal transitions which occur more frequently than one half the tag's internal clock rate. The output from carrier envelope detector 62 is a replica of the tone burst modulation envelope of the interrogation sequence. This modulation envelope is further processed in the low-pass filter 63 which prevents transitions spaced less than four clock periods apart from propagating further. The output from the low-pass filter is then processed in the transition detector 64 to develop a pulse at each change in level of the modulation envelope. The output from the transition detector 64 passes to the gate 124 in the clock and data separator 66. The latter is a state counter with timing controlled to allow the pulses developed from the modulation envelope to propagate in one of three directions. The first pulse received following a period exceeding maximum timing tolerance is considered to be the first pulse of a new message, setting the valid message state. To understand what happens it is necessary to consider the state of the circuit just prior to the receipt of this pulse. The flip-flop 129 is in its reset state with $\overline{Q}$ equal 1. The counter 149 is reset, its Q outputs are all equal to logical 0. Therefore, the junction 68 is at a logical 1. This enables gate 70, resets frame counter 75, and enables gate 124, carrier envelope detector 62, low-pass filter 63 and transition detector 64. The flip-flop 129 has a logical 0 applied to its D input. The output from transition detector 64 will be at a logical 0. Therefore, the output of gate 124 is a logical 1 and the gate 125 output is a logical 0. Flip-flop 128 is set with $\overline{Q}$ equal 0. Counter 130 is at a count of "9" with Q9 equal 1. Therefore, the inverter 141 applies an enabling logical 0 to gate 131.

At the first change in the logic level from the low-pass filter 63 due to an incoming pulse the transition detector 64 will produce an output of logical 1. This causes the output from gate 124 to go to 0 causing flip-flop 129 to be set through gate 131 and counter 130 to be reset through gate 125. When the pulse from gate 125 returns to 0 in response to the CLK pulse going high, it clocks flip-flop 128 to its "reset" state with Q equal 0 and $\overline{Q}$ equal 1.

Once counter 130 has been reset it immediately commences to count the internal clock pulses received via flip-flops 126 and 127 that divide the crystal clock frequency by a factor of four. Any subsequent transition pulses delivered by the transition detector 64 within timing tolerances expected for a data clock transition are directed out of the clock and data separator 66 via gate 136. Any transition pulses received within timing tolerances expected for a data 1 transition are directed out of the circuit as a data pulse via gate 137. Finally, any transition pulses received that are out of tolerance expected are directed to reset the circuit in preparation for a new message. If such occurrences coincide with counter 130 applying an output to either of its terminals Q1, Q2, Q5 or Q6, the reset pulse will be applied via gate 135 and gate 138 to the flip-flop 129. However, if the pulse coincides with a count of "9" or more the reset is accomplished by Q9 of counter 130 going to a logical 1 which clocks the flip-flop 129 into its reset condition due to the fact that a logical 0 is applied to its D input. In any case, even if a reset signal is applied to flip-flop 129 via gates 135 and 138 the counter 130 will continue to count to the count of "9" so as to apply an enabling signal to the gate 131 preparing it to receive the next incoming transition to set flip-flop 129. Flip-flop 128 will also be set via gate 139 thereby enabling gate 125 to pass a reset signal to the counter 130. Until the receipt by the counter 130 of such reset signal, the logical 1 at its Q9 output disables the counter from further counting operation by reason of its feedback connection to the clock enable ($\overline{CE}$) terminal of the counter.

The separated data and data clock signals derived from the clock and data separator 66 are compared in the interrogation sequence recognition circuit 67 with a preset code pattern established by the strapping of contacts 156, 157 and 158 as previously explained. The incoming signal is compared bit by bit with the preset pattern. Counter 149 steps with each bit and sequences in turn the selector 155. Any differences between the received sequence and the preset sequence will cause a reset signal to be applied from the X output of multiplexer 155 through gates 159 and 138 to reset flip-flop 129 and counter 149. The intitial starting condition is then assumed and the response to the next received signal will follow the procedure previously explained.

If a valid 6-bit signal consisting of the 110 preamble and the preset last three bits is received, the counter 149 will be permitted to reach a count of "6" applying a logical 0 to junction 68 which accomplishes several functions. It is fed back to the clock enable input of counter 149 to inhibit further counting of said counter. It also disables further passage of signals through the carrier envelope detector 62, the low-pass filter 63 and the transition detector 64 as well as disabling gate 124. In essence, this signal at junction 68 signifies the end of the receive mode of operation and the commencement of the transmit mode.

Referring to FIGS. 9A and 9B it will be seen that the logical 0 signal on conductor 74 will remove the reset input from counter 188 of the frame counter 75 enabling counter 188 to commence operation. In addition, gate 187 now applies an enabling signal to gate 186 such that clocking signals from bi-phase generator 84 furnished over connection 103 will be applied to the clock terminal of counter 175 that is connected to operate as a DOWN counter. It can be demonstrated that while the receiving portion of the tag circuit is in the receiving mode the counter 165 will be in a condition applying a logical 1 output to its Q4 terminal. Therefore, since there is a logical 1 on conductor 74 during the receive mode operation, the gate 187 will have a logical 0 output disabling gate 186 and barring clock pulses to the DOWN counter 175. This condition is reversed as soon as a logical 0 appears on conductor 74.

Whenever DOWN counter 175 reaches a zero count its carry out ($\overline{CO}$) output will produce a logical 0 output signal that enables gate 184 to output a 0. This enables flip-flop 181 to be reset with $\overline{Q}$ equal 1, enabling the preset enable of counter 175 permitting it to read in the next number from the counter 165 appearing at its input terminals P0 through P3. When the counter 175 is thus set to some numerical value other than zero it will cause its ($\overline{CO}$) terminal to output a 1. This returns the output of gate 184 to a 1. On the next positive clock pulse on lead 78 the flip-flop 181 will be restored with Q equal 1 and $\overline{Q}$ equal 0. The logical 1 on its Q output will clock counter 165 to its next count. The distribution of signals from the counter 165 to the preset inputs of counter 175 is such that when the Q0 output of counter 165 is high, counter 175 will be set for 3 counts; when the Q1 output of counter 165 is high, counter 175 will be set for 15 counts; when Q2 of counter 165 is high, counter 175 will be set for 7 counts; when Q3 of counter 165 is high, counter 175 will be set for 1 count while when Q4 of counter 165 is high, counter 175 is set for 0 count.

The operation of the timer is such that the first 0.625 mSec provides a delay during which no transmission occurs. The next timer interval with Q0 of counter 165 being high provides for an interval of 2.5 mSec. This corresponds to a duration of four bits permitting the transmission of the preamble pattern of 1110. During the next interval of the timer there is provision for an interval of 10 mSec corresponding to the transmission time for sixteen bits. During this interval the counter 175 is sequenced to select the sixteen different bits programed into the identification sequence generator 98. The bits from the sequence generator 98 are fed through gates 170 and 171 into the Hamming generator 95 as well as over lead 99A and through gates 210 and 213 to the Manchester modulator 83.

During the next timer interval of 5 mSec duration data from the Hamming generator 95 is shifted out through gates 211 and 213 to control gate 198 in the modulator 83.

Each complete response consisting of all states of the timer 76 is defined as a frame with the number of the frame in process accumulated in the frame counter circuit 75. Thirty two frames are allowed and during frame thirty three a pulse is generated returning the tag from its transmit mode to its receive mode.

Although the Manchester modulator is modulated during every frame it does not provide a modulated carrier output during each frame because the carrier is also gated by the output signal on lead 92 from the pseudorandum binary sequence reply counter 89. The reply counter section consisting of counter 209 is a DOWN counter which decrements on each cycle of the timer 76 except after frame 32. The carrier is passed to the Manchester modulator output only during the zero state of the DOWN counter 209. Whenever the Manchester modulator 83 is feeding an output signal to lead 106 it is also passing clocking signals back to the ripple counter 203 in the reply counter 89. The counter 203 divides the signal received from the output of modulator 83 by a factor of sixty four before producing a signal to sequence the pseudorandum binary sequence circuit consisting of flip-flops 204, 205 and 206. At the end of any frame in which the reply counter is in its zero state the reply counter is reloaded with a random number from the flip-flops 204, 205 and 206 constituting the pseudorandum binary sequence generator.

Referring now back to FIG. 5, although not shown, it will be understood that when the tag circuit is in the receiving mode the power amplifier driver 107 will have a high impedance so as not to load down the tag loop 60.

Referring now to FIGS. 10A and 10B there is shown therein the details of the receiver section located at the portal unit 15. Certain stages of the circuit in the portal receiving section are identical in construction and operation to those contained in the tag circuit, particularly that described with reference to FIG. 8A. These are shown merely in block form in FIG. 10A. Additional similarity exists and to the extent that the components are the same and function in a similar manner they are designated by the same reference numerals to which have been added a "−1". For example the carrier envelope detector 62-1 in FIG. 10A is identical to the carrier envelope detector 62 in FIG. 8A. Thus, if any signals are received by the portal receiver section while it is in its receiving mode with switch 31 conductive, such incoming signals will be tested and converted to transition pulses by the carrier envelope detector 62-1, the low-pass filter 63-1 and the transition detector 64-1. The output from the latter will then be furnished over conductor 65-1 to one input of gate 124-1. The other input of gate 124-1 is coupled to the output of an inverter 300 whose input is connected to a junction 301, the further connections of which will be described below.

The portal receiver in FIG. 10B has a clock and data separator 302 which is almost identical to the clock and data separator 66 described with reference to FIG. 8B. The primary difference resides in the circuitry feeding the clock input of decade counter/divider 130-1. As shown in FIG. 10B the clock input of decade device 130-1 is connected to the $\overline{Q}$ output of a D flip-flop 303 whose D and $\overline{Q}$ terminals are joined together to constitute a frequency divider. The clock input of flip-flop 303 is furnished with a $\overline{CLK}$ clocking signal from lead 304 coupled back to the output of an inverter 305 in FIG. 10A whose input is connected to the clock output 78-1 of the crystal controlled clock 77-1. Consequently, whereas the clocking frequency supplied to the decade counter/divider 130 in the circuit of FIG. 8B was divided by four the comparable clocking frequency in the circuit of FIG. 10B is divided only by two. The reason for this should be self-evident since the baud rate of the identification tag transmitter is twice that of the portal transmitter. The lower baud rate of the portal transmitter results from the additional flip-flop 35 interposed between the clock 17 and binary counter 36 in the portal transmitter illustrated in FIG. 6.

One other difference between the clock and data separator 302 of the portal receiver and that of the tag receiver is that in the former the gate 138-1 instead of having one of its inputs connected to the output of the frame counter now has such input connected over lead 306 to the output of a processing unit (P.U.) 307. The lead 306 is also connected through a resister 308 to the logical 0 potential level. Therefore, in the absence of a logical 1 output from the processing unit 307, the lead 306 will be brought to a logical 0 value. This will shift to a logical 1 value when the processing unit puts out a logical 1 voltage level. In all other respects the clock and data separator 302 is the same as and functions in the same manner as the clock and data separator 66.

Assuming that proper clock and data pulses are received they are passed on by the separator 302 to the identification sequence recognition circuit 309. The circuit 309 has a number of identical component parts to those found in the interrogation sequence recognition circuit 67 shown in FIG. 8B. To the extent that they are identical, such components are identified by the same reference numerals followed by a "−1". In order that the identification sequence recognition circuit 309 can test the signal incoming from a presumed identification tag there is provided a circuit for comparing on a bit by bit basis the first four bits or preamble received from a possible tag. This is accomplished by the combination of a type 4017 decade counter/divider 310 having its Q0 through Q3 outputs connected respectively to the control inputs of the four sections, 311, 312, 313 and 314, of a type 4016 quad analog switch. The "In" terminals of switch sections 311, 312 and 313 are connected together and to the output of the gate 152-1. The input to switch section 314 is connected to the output of gate 151-1. The outputs of all of the switch elements 311 through 314 are connected together and through a resister 315 to the logical 1 potential level. The junction between resister 315 and the switch outputs is connected to one of the inputs of gate 159-1. The reset terminal of counter 310 is coupled to the $\overline{Q}$ output of flip-flop 129-1 in the clock and data separator 302. The clock enable ($\overline{CE}$) terminal of the counter 310 is connected to its own Q4 output as well as to an output lead 316 coupled to an inverter 317 in the 24-bit shift register 318. The latter consists of three type 4015 dual 4-bit static shift registers connected in tandem as shown in the drawings. The data or D input to the first 4-bit register 319 is connected over lead 320 to the output of gate 152-1 in the identification sequence recognition circuit 309. All of the clock inputs of the shift register units in register 318 are connected together and to the lead 143-1 connected to the Q output of flip-flop 128-1 in the clock and data separator 302. All of the Reset terminals of the shift registers in register 318 are connected together and to the output of the inverter 317. All of the Q outputs from the shift register units in register 318 are connected for parallel transfer via cable 321 to the processing unit 307. The latter unit will be provided with appropriate buffers and registers in known manner to receive the coded message previously shifted into register 318 for subsequent processing.

In order to time the incoming message on a bit by bit basis there is provided a 24-bit counter 322 composed of two type 4022 octal counter/divider circuits 323 and 324. The counter 323 has its carry out terminal coupled to the clock terminal of counter 324. Thus counter 323 passes every eighth pulse to the counter 324. The latter, in turn, has its Q3 output connected to the junction 301. In this manner, the counters 323 and 324 furnish an output pulse for every 24 input pulses. The Reset terminals of the counters 323 and 324 are connected to the output of inverter 317 so that 24-bit counter 322 is reset at the same time that the 24-bit shift register 318 is reset. As shown, the clock enable terminals of counters 323 and 324 are tied to the logical 0 potential level. This maintains such circuits in enabled condition for counting whenever their reset terminals are not furnished with a reset signal.

The junction 301 that is fed with signal output from the 24-bit counter 322 is connected both to an input of the processing unit 307 and to the components previously described as connected to the junction 301. This is all clearly shown in the drawing.

For convenience in visualizing the operation of the receiver section of the portal unit reference may also be had to the block diagram of FIG. 4 that carries the same numerals found in FIGS. 10A and 10B. Operation of the remainder of the portal receiver will be as follows. The first four valid pulses received will be compared on a bit by bit basis in the identification sequence recognition circuit 309 to see whether or not they follow the 1110 pattern that constitutes a fixed identification of an identification tag forming a part of the overall system. If the incoming signal meets this particular requirement, counter 310 will reach a count of "4" placing a logical 1 on its Q4 output which inhibits further counting operation of the counter 310 by reason of the feedback connection to its $\overline{CE}$ input. Said Q4 output also functions through inverter 317 to remove the reset signal from the registers in shift register 318 and from the counters in counter 322. Thus, if 24 additional valid bits are received they will be shifted sequentially into the shift register 318 and counted by the 24-bit counter 322. After receipt of the 24th bit the counter 322 will produce a logical 1 output that signals the processing unit to accept the signals from the cable 321 transferring the same from register 318.

At the same time, the signal at junction 301 will block gates 124-1 and 70-1, and reset carrier envelope detector 62-1, low-pass filter 63-1, and transition detector 64-1. Further signal reception that might interfere with transfer of the complete message in shift register 318 to the processing unit 307 will be blocked until the processing unit 307 completes acceptance of such message over cable 321. Once this function is completed the processing unit 307 will furnish a logical 1 output to lead 306 causing a reset signal to be applied through gate 138-1 to the flip-flop 129-1. This will function to reset counter 310 causing its Q4 output to return to a logical 0 and thereby resetting the shift register 318 and counter 322. This will now cause the signal at junction 301 to return to a logical 0 level restoring the components of the portal receiver shown in FIGS. 10A and 10B to the receiving mode. Further reception of successive messages from identification tags will be accomplished for the duration of the receiving mode time interval established by timer 24. It will be understood that during this receiving interval the portal receiver may receive identification signals from more than one tag but since these will occur during different randomly selected intervals depending upon the output of the pseudorandum generator in the respective tag, the majority of such signals will not interfere with one another. As mentioned previously, during each complete transmission cycle from a tag there are 32 possible time slots during which an identification signal can be transmitted. Of these 32 time slots, for a given tag, only at least four and generally no more than eight time slots will be occupied. Since all of the tags are synchronized with a portal interrogation signal their respective transmission periods will commence approximately at the same time. The likelihood that the transmissions from each tag will occur during different time slots has extremely high probability, at least for several responses from each. Bearing in mind that each identification tag has a unique identification signal pattern, the processing unit 307 in the portal receiver can identify and associate each set of received signals with a particular tag. Further validation by the processing unit can be accomplished as desired.

Because of the random transmission, there will be instances when transmissions from more than one tag will occur at the same time. The nature of the signals utilized is such that if the carrier signals from the tags are out-of-phase, the preambles will normally be lost either through complete cancellation or distortion with the signals not getting past the carrier envelope detector, low-pass filter, and transition detector circuits in the portal receiver. However, it is possible for the carrier signals from plural tags to be sufficiently in phase that the signals not only get past the transition detector but pass through the clock and data separator into the indentification sequence recognition circuit 309. In the latter circuit the preamble, being the same from each tag, will pass the preamble test thereby enabling the shift register 318 to receive the subsequent portion of the transmission. But, because the identification codes are different for each tag, a garbled identification, in the absence of an overriding control, would be accepted by the register 318. The unique circuitry in the portal receiver, however, bars such occurrence.

Figure 11:
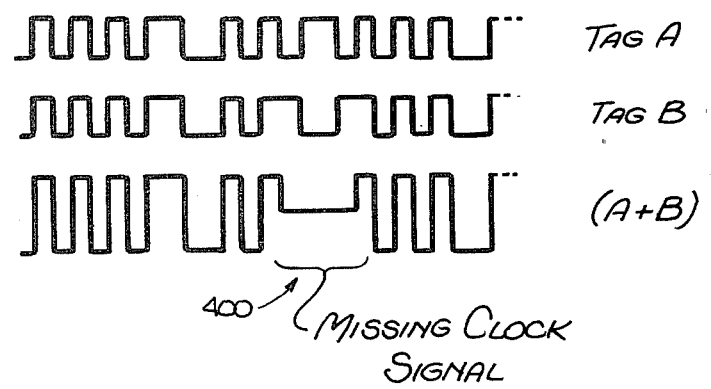
FIG. 11 is a diagram illustrating the initial portion of the signal transmission from two separate tags and the response engendered in the portal receiver.

Referring to FIG. 11, there is illustrated a possible condition wherein reply transmissions from tags A and B occur simultaneously and with their respective preambles in phase. The identification codes, of which only the first few bits are illustrated, are assumed to be different. The summation of the signals from the two tags will be somewhat as shown on the line designated (A+B). It will immediately be apparent that in the region where the codes differ there is a loss of clock signal. Thus, upon occurrence of the signal in the vicinity of the reference numeral 400, since the clock signal is suppressed, the counter 130-1 will reach a count of "9" with Q9 equal 1 which causes the circuit to reset thereby barring further reception until another validated preamble is received. Nevertheless, because of the randomly selected transmission intervals, the majority of the transmissions from each tag will be received as noted above.

For the purpose of recapitulation, the present invention contemplates the use of a particular digital code format for establishing communication between a portal unit or monitoring station and an identification tag. The encoding scheme used by the modulators herein is known as bi-phase mark coding also known as Manchester. Such coding is characterized by the fact that a logical 1 has a second transition in the middle of the bit cell and a logical 0 does not. Bi-phase mark coding is one of several keying formats that have the characteristic that if two different code patterns in that format are summed at least some of the self-contained clock rate transitions disappear. It is that characteristic that is utilized as explained above to reject signals that are received simultaneously from more than one source.

Although only one portal unit has been shown in the drawings, it is to be understood that a given facility such as a hospital would have a plurality of portal units, these may number in the hundreds, and all would be interconnected with one or more central processing units, CPU, for accomplishing the ultimate record keeping and control function. Just as a portal unit can identify a tag, a central processing unit can identify a portal unit. Using any known multiplexing scheme, the CPU can sequentially extract stored information from each portal processing unit. In this manner the CPU will obtain information as to the whereabouts of each identification tag.

At a portal unit, the portal transmitter continuously emits an interrogation signal consisting of a preamble that is generically indicative to any identification tag receiving the same that such signal has eminated from a portal unit. In addition, the portal interrogation signal includes a code indicator of the particular hospital or other facility in which it is installed. Only tags coded for that hospital or facility will respond to the interrogation.

All tags within range of such interrogation will test and validate the interrogation signal. If the signal is validated it will serve to synchronize the commencement of a response transmission during which a plurality of responses, all identical for a given tag, will be transmitted at randomly selected intervals during a transmission period. The example described herein provides for thirty two transmission time slots each having a duration of approximately 19.375 mSec. Obviously, the number of time slots could be altered depending upon the time available for communication between portal and tag and the bit rate used. The bit rate can readily be changed by changing the crystal clock frequency. Therefore, it can be assumed that the system may have provision for "n" time slots of "t" duration.

The tag circuit described herein employs a pseudo-random sequence generator. While a truly random source might be utilized, it has not been found to be necessary. However, it might be advantageous to provide for further scrambling of the 7-digit output from the pseudorandom generator to the reply counter. The choice will depend upon the average number of responses desired within a single complete transmission cycle from a tag.

Each tag responds with a twenty-eight bit message consisting of a four bit fixed 1110 preamble designed to avoid confusion with a portal transmission and to serve as a generic identifier to the portal unit that a signal from a tag is being received. It also functions to synchronize the portal receiver for reception of the next twenty-four bits that contain the tag identification and an error checking code based upon the principles developed by Richard Hamming.

Although the subject invention has been described with reference to a system for establishing communication between a monitoring station and a plurality of tag circuits, it is to be understood that the principles have broader application. That is, they may be relied upon in a system for establishing simultaneous communication between an interrogating station and a plurality of transponder circuits where it is desired to interrogate all of said transponder circuits during the same time interval. In such case the transponder circuits would correspond to the individual tag circuits and the interrogating station would correspond to the monitoring station.

Having described the present invention with reference to one specific embodiment thereof, it will be understood by those skilled in the subject art that numerous changes in implementation and operation can be incorporated without departing from the true spirit of the invention as defined in the appended claims. There are many equivalent solid state components that can accomplish the same function, and while discrete logic components have been used, the same circuitry or equivalent can be produced in integrated form by known techniques. In fact, contemporary microcomputer chips can be programmed to accomplish the equivalent functions. All of these variations are contemplated as coming within the purview of the present invention.

What is claimed is:

1. A communication system for detecting whenever one or more of a plurality of independent tag circuits comes within range of a monitoring station and identifying such tag circuits as come within said range even though more than one tag circuit may come within said range at the same time, said system comprising means for disposition at said monitoring station for radiating an interrogating signal containing a first code pattern identifiable with said monitoring station; a tag circuit containing means for receiving said interrogating signal whenever said tag circuit is within range of said monitoring station, and means for responding to said interrogating signal, said last mentioned means comprising means for radiating a series of response signals each containing a predetermined second code pattern different from said first code pattern and identifiable with said tag circuit, and means for varying in at least a pseudorandom manner the intervals between successive response signals; and further means for disposition at said monitoring station for receiving and testing any signals that are within range of said station to determine if such last mentioned signals contain a predetermined code pattern identifiable with a tag, and only if such last mentioned code pattern is present, passing on said received signals to a processing unit.

2. A communication system according to claim 1, wherein said means for radiating an interrogating signal comprises a timing element for periodically enabling an interrogating signal radiation cycle followed by an interval of no signal radiation of sufficient duration to receive during said interval a plurality of said response signals from a tag.

3. A communication system according to claim 2, wherein said tag circuit includes means for establishing "n" time slots of "t" duration within which said response signals may be radiated, the number of response signals actually radiated during any single complete cycle of operation being a function of said pseudorandom intervals established during said complete cycle, and the said duration of said interval of no signal radiation by said means for radiating an interrogating signal is at least equal to (n×t).

4. A communication system according to claim 1, wherein said means for radiating a series of response signals comprises a source of carrier frequency signals and means for modulating said carrier signals with said series of response signals; and said means for varying the intervals between successive response signals comprises a pseudorandom binary sequence generator having a clock input coupled to an output of said modulating means.

5. A communication system according to claim 4, wherein said means for varying the intervals between successive response signals further comprises a presettable binary down-counter, means coupling said down-counter to said pseudorandom generator for presetting said down-counter to the then existing count in said pseudorandom generator whenever said down-counter reaches zero count, and means for clocking said down-counter once for each of "n" time slots within which a response signal might be radiated, and radiating a response signal during each of said time slots in which said down-counter reaches zero count.

6. A communication system according to claim 5, wherein said tag circuit includes means for establishing said "n" time slots, each of "t" duration; and wherein the said duration of said interval of no signal radiation by said means for radiating an interrogating signal is at least equal to (n×t).

7. A communication system according to claim 2, wherein said means for radiating an interrogating signal comprises means for producing said first code pattern, said last mentioned means being constructed and arranged to generate a code pattern consisting of a first preamble code pattern indicative generically of a signal from a monitoring station and a first presettable code pattern identifying a particular monitoring station.

8. A communication system according to claim 7, wherein said means for radiating a series of response signals includes means constructed and arranged to generate said second code pattern containing a second preamble code pattern different from said first preamble code pattern and indicative generically of a signal from a tag circuit and a second presettable code pattern uniquely identifying a particular tag circuit.

9. A communication system for detecting whenever one or more of a plurality of independent tag circuits comes within range of a monitoring station and identifying such tag circuits as come within said range even though more than one tag circuit may come within said range at the same time, said system comprising means for disposition at said monitoring station for radiating an interrogating signal containing a first code pattern identifiable with said monitoring station; a tag circuit containing means for receiving said interrogating signal whenever said tag circuit is within range of said monitoring station, means for testing said interrogating signal to determine whether or not said first code pattern corresponds to a preset interrogation code pattern, and means for responding to said interrogating signal only if said testing establishes such correspondence, said last mentioned means comprising means for radiating a series of response signals each containing a predetermined second code pattern different from said first code pattern and identifiable with said tag circuit, and means for varying in at least a pseudorandom manner the intervals between successive response signals; and further means for disposition at said monitoring station for receiving and testing any signals that are within range of said station to determine if such last mentioned signals contain a predetermined code pattern identifiable with a tag, and only if such last mentioned code pattern is present, passing on said received signals to a processing unit.

10. A tag circuit for communicating with and furnishing identification to a monitoring station whenever said tag circuit comes within range of said monitoring station and independent of the simultaneous presence within said range of another tag circuit, said tag circuit comprising means for receiving from said monitoring station an interrogating signal containing a first code pattern when in range of said station, and means for responding to said interrogating signal, said last mentioned means comprising means for radiating a series of response signals each containing a predetermined second code pattern different from said first code pattern and identifiable with said tag circuit, and means for varying in at least a pseudorandom manner the intervals between successive response signals.

11. A tag circuit according to claim 10, further comprising means for establishing "n" time slots of "t" duration within which said response signals may be radiated, the number of response signals actually radiated during any single complete cycle of operation being a function of the said pseudorandom intervals established during said complete cycle.

12. A tag circuit according to claim 10, wherein said means for radiating a series of response signals comprises a source of carrier frequency signals and means for modulating said carrier signals with said series of response signals; and said means for varying the intervals between successive response signals comprises a pseudorandom binary sequence generator having a clock input coupled to an output of said modulating means.

13. A tag circuit according to claim 12, wherein said means for varying the intervals between successive response signals further comprises a presettable binary down-counter, means coupling said down-counter to said pseudorandom generator for presetting said down-counter to the then existing count in said pseudorandom generator whenever said down-counter reaches zero count, means for clocking said down-counter once for each of "n" time slots within which a response signal might be radiated, and radiating a response signal during each of said time slots in which said down-counter reaches zero count.

14. A tag circuit according to claim 13, wherein said tag circuit includes means for establishing said "n" time slots, each of "t" duration.

15. A tag circuit according to claim 10, wherein said means for radiating a series of response signals includes means constructed and arranged to generate a code pattern containing a preamble code pattern indicative generically of a signal from a tag circuit and a presettable code pattern uniquely identifying the particular tag circuit.

16. A tag circuit according to claim 15, wherein said means for radiating a series of response signals further includes means for appending to each response signal an error correcting code pattern related to said presettable code pattern.

17. A tag circuit according to claim 16, wherein said means for appending an error correcting code pattern comprises a Hamming generator.

18. A tag circuit for communicating with and furnishing identification to a monitoring station whenever said tag circuit comes within range of said monitoring station and independent of the simultaneous presence within said range of another tag circuit, said tag circuit comprising means for receiving from said monitoring station an interrogating signal containing a first code pattern when in range of said station, means for testing said interrogating signal to determine whether or not said first code pattern corresponds to a preset interrogation code pattern, and means for responding to said interrogating signal only if said testing establishes such correspondence, said last mentioned means comprising means for radiating a series of response signals each containing a predetermined second code pattern different from said first code pattern and identifiable with said tag circuit, and means for varying in at least a pseudorandum manner the intervals between successive response signals.

19. A communication system for detecting whenever one or more of a plurality of independent tag circuits comes within range of a monitoring station and identifying such tag circuits as come within said range even though more than one tag circuit may come within said range at the same time, said system comprising means for disposition at said monitoring station for radiating an interrogating signal identifiable with said monitoring station; a plurality of tag circuits each containing means for receiving said interrogating signal whenever the respective tag circuit is within range of said monitoring station, and means for responding to said interrogating signal, said last mentioned means comprising means for radiating a series of response signals each containing a predetermined code pattern identifiable with the respective tag circuit, and means for varying in at least a pseudorandum manner the intervals between the successive response signals from each tag circuit; and further means for disposition at said monitoring station for receiving any signals that are within range of said station and rejecting any of said response signals that arrive at said monitoring station from one tag circuit at the same time as a response signal from another tag circuit.

20. A communication system according to claim 19, wherein said further means for disposition at said monitoring station comprises means for timing the occurrence of code pattern transitions present in a received signal, and means responsive to said last mentioned means for rejecting any signals if said code pattern transitions fail to occur at predetermined timed intervals corresponding to a response signal clock rate.

21. A communication system for establishing simultaneous communication between an interrogating station and a plurality of transponder circuits, said system comprising means for disposition at said interrogating station for transmitting an interrogating signal; a plurality of transponder circuits each containing means for receiving said interrogating signal, and means for responding to said interrogating signal, said last mentioned means comprising means for transmitting a series of response signals each containing a predetermined code pattern associated with the respective transponder circuit, said code pattern being based upon a keying format such that if two different code patterns are summed at least some of the self-contained clock rate transitions disappear, and means for varying in at least a pseudorandom manner the intervals between the successive response signals from each transponder circuit; and further means for disposition at said interrogating station for receiving any signals that are transmitted by a transponder circuit and rejecting any of said response signals that arrive at said interrogating station from one transponder circuit at the same time as a response signal from another transponder circuit.

22. A communication system according to claim 21, wherein said further means for disposition at said interrogating station comprises means for timing the occurrence of code pattern transitions present in a received signal, and means responsive to said last mentioned means for rejecting any signals if any of said self-contained clock rate transitions disappear.

* * * * *